(12) United States Patent
Kalajzich

(10) Patent No.: US 10,694,732 B2
(45) Date of Patent: Jun. 30, 2020

(54) STORAGE DEVICE

(71) Applicant: SAFE PASSAGE PTY LTD, Geraldton WA (AU)

(72) Inventor: Wade G. Kalajzich, Geraldton WA (AU)

(73) Assignee: SAFE PASSAGE PTY LTD, Geraldton WA (AU)

( * ) Notice: Subject to any disclaimer, the term of this patent is extended or adjusted under 35 U.S.C. 154(b) by 0 days.

(21) Appl. No.: 16/094,670

(22) PCT Filed: Apr. 13, 2017

(86) PCT No.: PCT/AU2017/000089
§ 371 (c)(1),
(2) Date: Oct. 18, 2018

(87) PCT Pub. No.: WO2017/181215
PCT Pub. Date: Oct. 26, 2017

(65) Prior Publication Data
US 2019/0124906 A1 May 2, 2019

(30) Foreign Application Priority Data
Apr. 18, 2016 (AU) .................................. 2016901444

(51) Int. Cl.
*A01K 97/08* (2006.01)
*A45C 11/00* (2006.01)
(Continued)

(52) U.S. Cl.
CPC ................ *A01K 97/08* (2013.01); *A45C 5/00* (2013.01); *A45C 5/08* (2013.01); *A45C 11/00* (2013.01); *A47B 81/005* (2013.01)

(58) Field of Classification Search
CPC ...... A01K 97/08; A47B 81/005; A61C 19/02; B25H 3/023; B01L 99/00; A61L 2/26; A45C 5/00; A45C 5/08; A45C 11/00
See application file for complete search history.

(56) References Cited

U.S. PATENT DOCUMENTS

| 827,736 | A | 8/1906 | Lamphier |
| 3,337,028 | A | 8/1967 | Glavan |

(Continued)

FOREIGN PATENT DOCUMENTS

| JP | 2000279081 | 10/2000 | |
| KR | 101230676 B1 * | 2/2013 | ........... B60C 11/243 |

OTHER PUBLICATIONS

Search Report & Written Opinion issued in Int'l App. No. PCT/AU2017/000089 (dated 2017).

(Continued)

*Primary Examiner* — Ko H Chan
(74) *Attorney, Agent, or Firm* — Barnes & Thornburg LLP; G. Peter Nichols

(57) ABSTRACT

A storage device for holding at least one elongate article includes a wall having an interior wall surface and an exterior wall surface, the wall being deformable about a longitudinal axis between an open configuration and a closed configuration, the closed configuration defining a longitudinally extending cavity; and at least one retainer clip coupled to, or integrally formed with, the interior wall surface, the retainer clip(s) being configured to receive and retain the elongate article(s) in a generally longitudinally extending orientation. In the closed configuration, the retainer clip(s) and any elongate article(s) retained by the retainer clip(s) are located within the cavity. In the open configuration, access is provided to the retainer clip(s)

(Continued)

thereby allowing the elongate article(s) to be received and removed from the retainer clip(s).

20 Claims, 31 Drawing Sheets

(51) Int. Cl.
*A45C 5/08* (2006.01)
*A45C 5/00* (2006.01)
*A47B 81/00* (2006.01)

(56) References Cited

U.S. PATENT DOCUMENTS

| | | | | |
|---|---|---|---|---|
| 3,637,177 | A * | 1/1972 | Santucci | F16B 11/006 248/74.3 |
| 4,117,914 | A | 10/1978 | Snyder | |
| 4,784,554 | A * | 11/1988 | Break | B25B 5/104 403/341 |
| 4,789,286 | A * | 12/1988 | Laput | F16B 7/044 248/296.1 |
| 5,106,040 | A * | 4/1992 | Cafmeyer | H02G 3/26 248/292.14 |
| 5,258,166 | A * | 11/1993 | Janzer | A61C 19/02 206/369 |
| 5,425,194 | A | 6/1995 | Miller | |
| 5,742,982 | A * | 4/1998 | Dodd | F16G 11/00 24/16 R |
| 5,971,167 | A * | 10/1999 | Finbow | A47G 23/0208 206/426 |
| 6,087,593 | A * | 7/2000 | Skipworth | B60R 16/0215 174/135 |
| 6,352,154 | B1 | 3/2002 | Atsushi | |
| 6,375,017 | B1 * | 4/2002 | Schattner | A61M 5/1418 211/70 |
| 6,528,728 | B1 * | 3/2003 | Shima | H02G 3/0437 174/101 |
| 7,104,402 | B2 * | 9/2006 | Whalen | A45C 11/00 206/315.11 |
| 7,367,331 | B1 | 5/2008 | Horinek | |
| 2005/0188509 | A1 * | 9/2005 | Sharkey | F16L 3/1025 24/20 R |
| 2006/0096654 | A1 * | 5/2006 | Loeffler | B21C 47/34 140/147 |

OTHER PUBLICATIONS

International Preliminary Report on Patentability issued in Int'l App. No. PCT/AU2017/000089 (dated 2018).
Extended Search Report issued in Appl. No. EP 17785146.6 (dated Nov. 13, 2019).

* cited by examiner

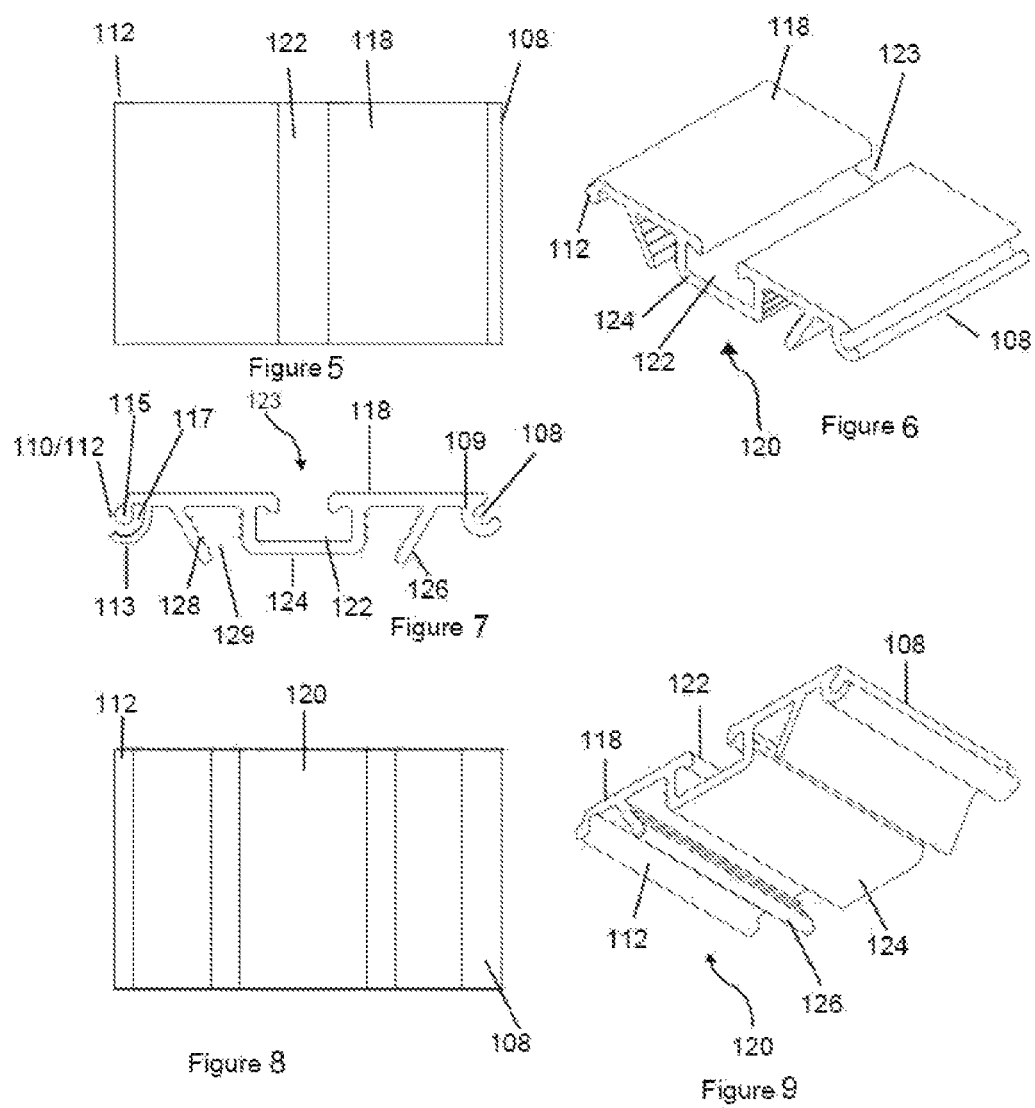

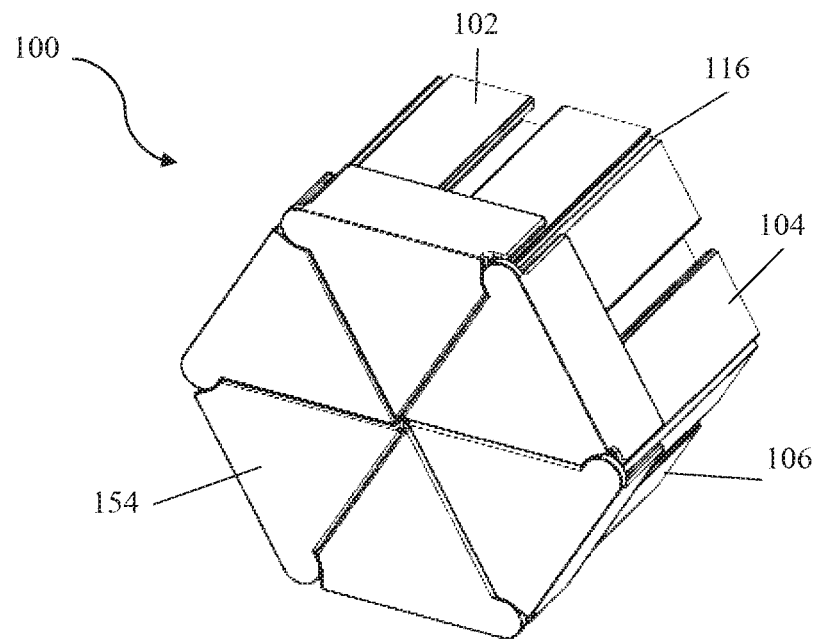
Figure 16
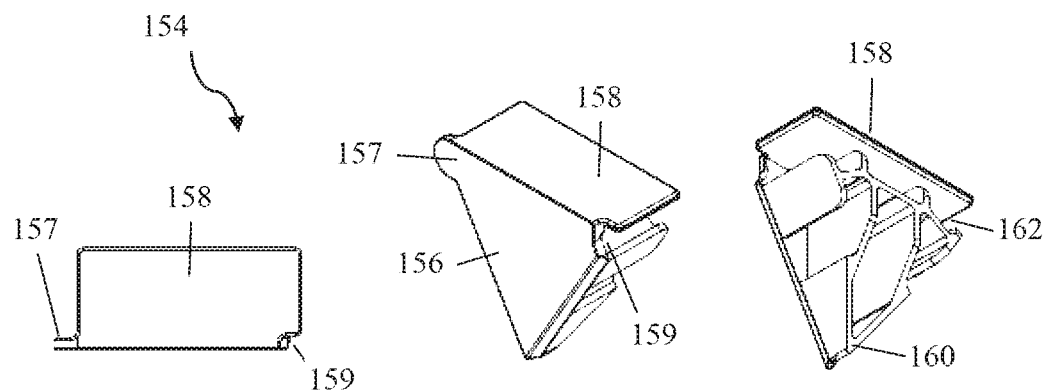
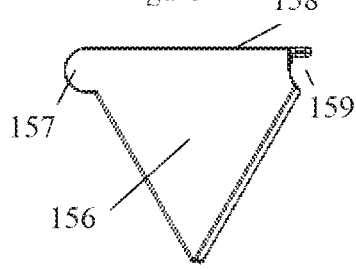
Figure 20
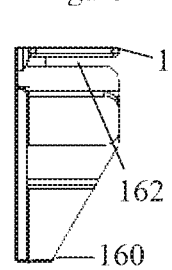
Figure 21
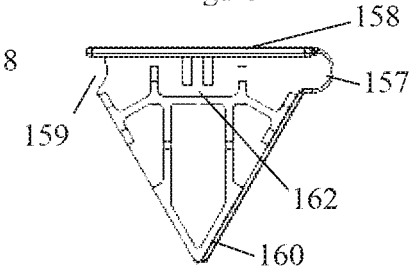
Figure 22

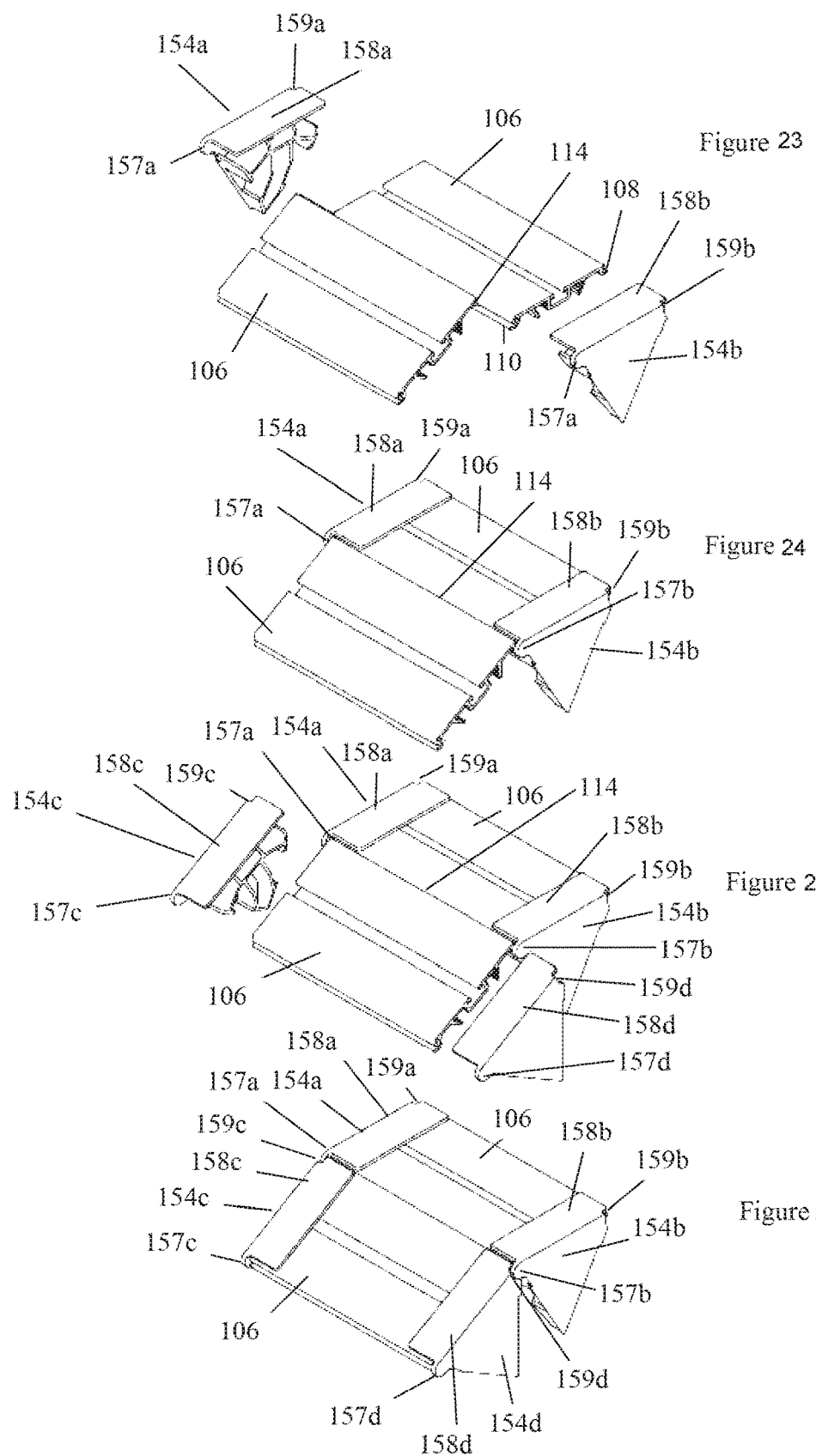

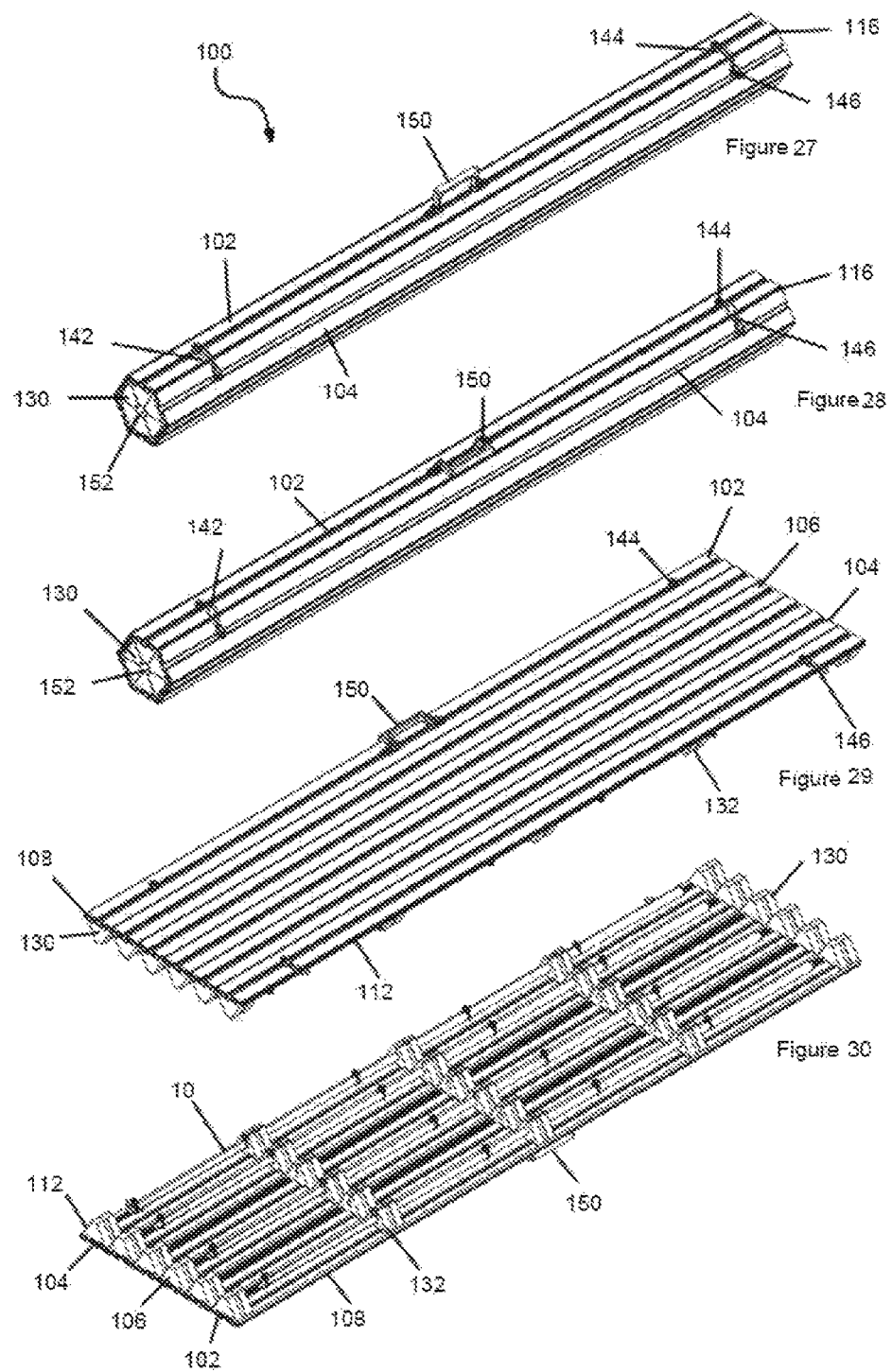

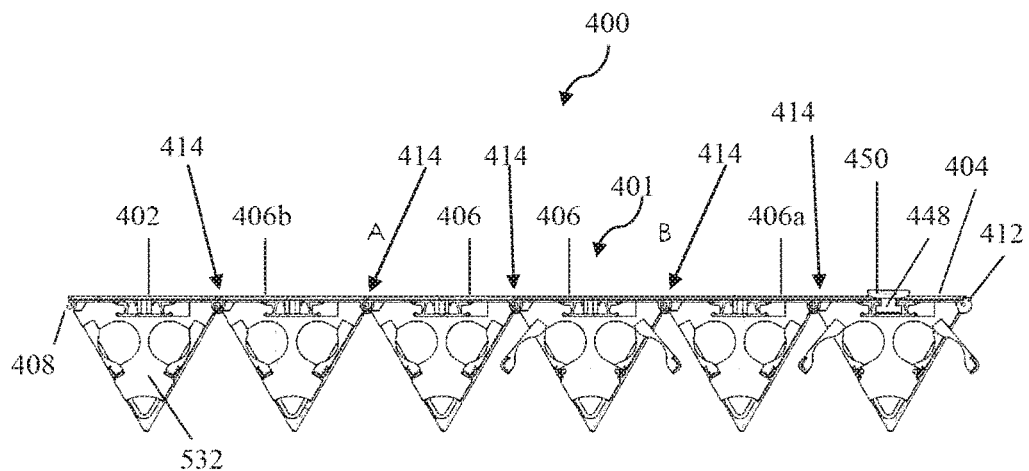
Figure 62
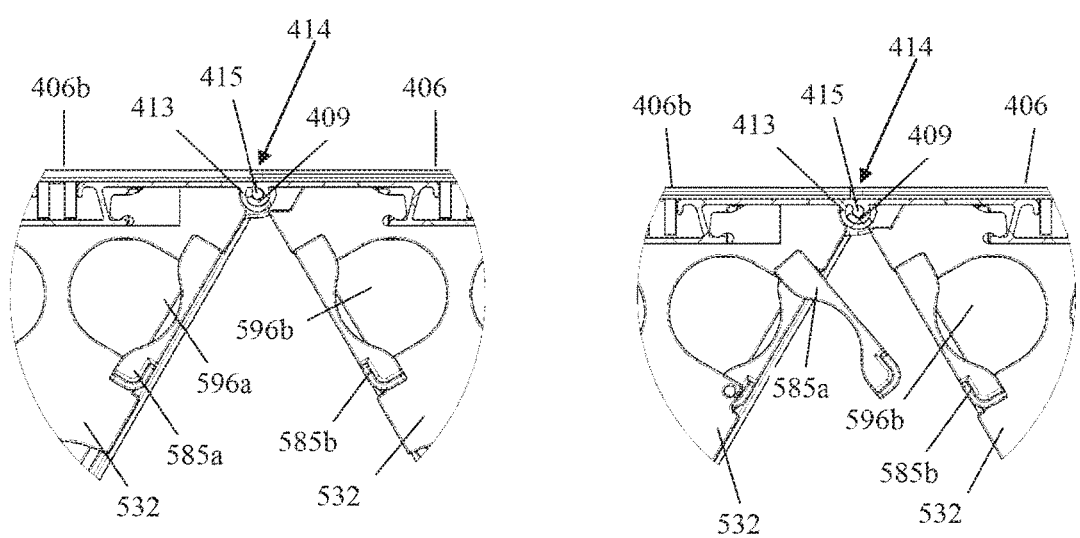
Figure 63
Figure 64

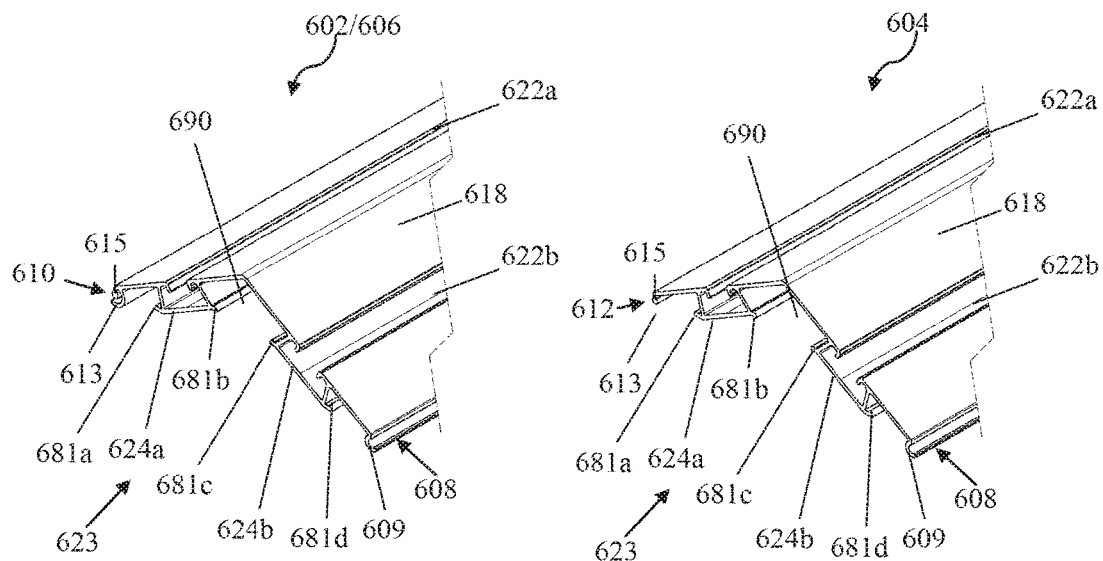
Figure 71
Figure 72
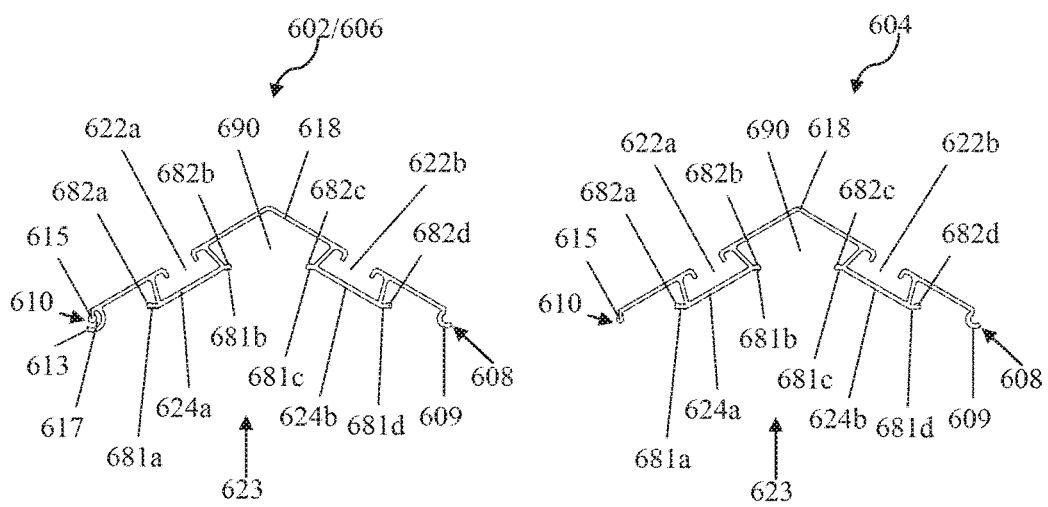
Figure 73
Figure 74

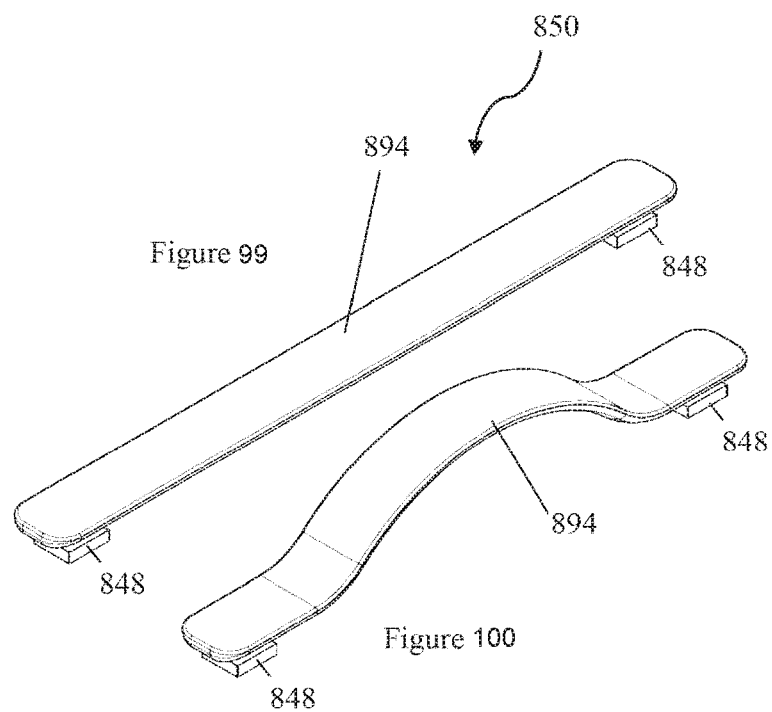
Figure 99
Figure 100
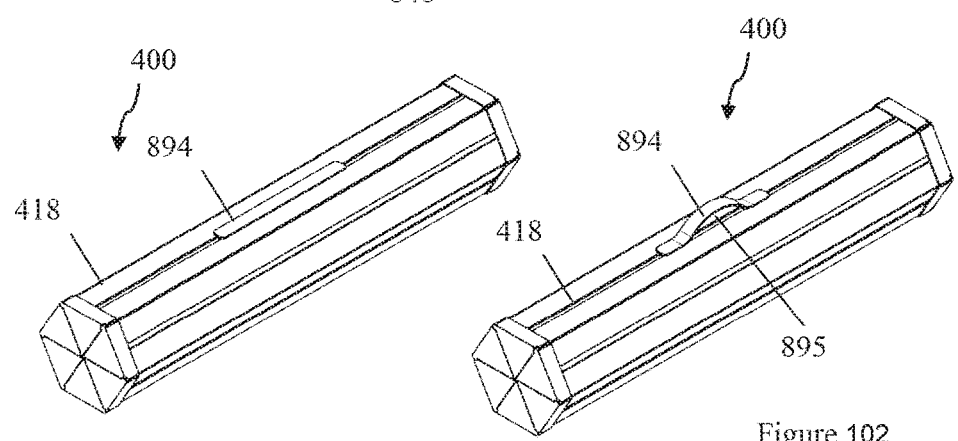
Figure 101
Figure 102
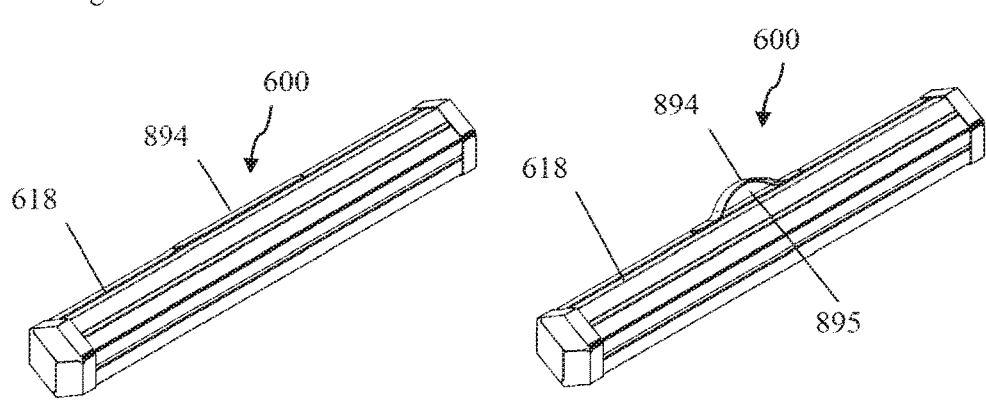
Figure 103
Figure 104

STORAGE DEVICE

This application is a U.S. nationalization under 35 U.S.C. § 371 of International Patent Application No. PCT/AU2017/000089, filed Apr. 13, 2017, which claims priority to Australian Application No. 2016901444, filed Apr. 18, 2016; the entire contents of each are incorporated herein by reference.

FIELD

The present invention relates to a storage device for holding one or more elongate articles, such as fishing rods.

BACKGROUND

Fishing rod tubes for transporting fishing rods are known. They typically comprise a tube having removable caps at one or both ends such that one or more fishing rods may be inserted and removed from the tube.

A disadvantage with known fishing rod tubes is that the fishing rods are not restrained within the tube and are, therefore, free to come into contact with any other object in the tube, including other fishing rods. Whilst fishing rods are very durable/flexible, the guides and guide linings are susceptible to damage when they come into with other hard surfaces or sudden/large impacts. Once the guide or guide lining has been damaged it is likely to damage fishing line and, therefore, need to be replaced.

When removing a fishing rod from known fishing rod tubes, it is typical to remove all of the fishing rods from the tube to reduce the likelihood of damage to the fishing rods caused by impacts with the rod tube of other rods or miscellaneous objects in the tube. As will be appreciated, this can be a cumbersome and time consuming process.

Another disadvantage of known fishing rod tubes is that they are susceptible to being crushed, which may consequently damage the fishing rods stored therein. This problem is addressed by forming the tube from heavy gauge materials. The use of heavy gauge materials increases the weight and cost to manufacture the fishing rod tube.

OBJECT OF THE INVENTION

It is an object of the present invention to substantially overcome or at least ameliorate one or more of the foregoing disadvantages.

SUMMARY OF INVENTION

An aspect of the present invention provides a storage device for holding at least one elongate article, the storage device comprising:

a wall having an interior wall surface and an exterior wall surface, the wall being deformable about a longitudinal axis between an open configuration and a closed configuration, the closed configuration defining a longitudinally extending cavity; and at least one retainer clip coupled to, or integrally formed with, the interior wall surface, the retainer clip(s) being configured to receive and retain the elongate article(s) in a generally longitudinally extending orientation;

wherein:

in the closed configuration, the retainer clip(s) and any elongate article(s) retained by the retainer clip(s) are located within the cavity, and, in the open configuration, access is provided to the retainer clip(s) thereby allowing the elongate article(s) to be received and removed from the retainer clip(s).

In a preferred form, the storage device further comprises a releasable coupling configured to releasably retain the wall in the closed configuration.

In a preferred form, the wall comprises a plurality of longitudinally extending wall sections, the plurality of wall sections comprising:

a first end wall section;

a second end wall section; and one or more intermediate wall sections disposed between the first and second end wall sections, further wherein each wall section has a longitudinally extending first edge and a longitudinally extending second edge.

In a preferred form, a plurality of the retainer clips are coupled to, or integrally formed with, the interior wall surface.

In a preferred form, the plurality of retainer clips are arranged in transversely extending sets, each set being longitudinally spaced from adjacent sets.

In a preferred form, adjacent retainer clips in each set abut to provide support to the wall when the wall is in the closed configuration.

In a preferred form, each wall section has one retainer clip of each set coupled to, or integrally formed with, the interior wall surface In a preferred form, a pivotal coupling pivotally couples adjacent wall sections.

In a preferred form:

the first edge of each intermediate wall section and the first edge of the second end wall section each comprise a first coupling profile; and the second edge of each intermediate wall section and the second edge of the first end wall section each comprise a second coupling profile, further wherein each pivotal coupling is formed by one of the first coupling profiles engaging an adjacent second coupling profile.

In a preferred form:

the first edge of the first end wall section comprises the first coupling profile; and the second edge of the second end wall section comprises a third coupling profile, further wherein the first coupling profile of the first end wall section and the third coupling profile of the second end wall section form the releasable coupling.

In a preferred form, each pivotal coupling is configured to limit pivotal movement of adjacent wall sections to between the closed configuration and the open configuration.

In a preferred form, each wall section is in the form of an extrusion having a uniform profile.

In a preferred form, the storage device further comprises at least one securing means coupled to the exterior wall surface, wherein each securing means extends across the releasable coupling to releasably secure the wall in the closed configuration.

In a preferred form, each securing means comprises a lug and a loop, the lug and the loop being coupled to the exterior wall surface such that when the loop engages the lug the loop extends across the releasable coupling.

In a preferred form, the storage device further comprises a plurality of cap sections, each cap section being coupled to one of the longitudinal ends of each wall section, wherein the cap sections coupled to one of the longitudinal ends of each wall section cooperate to close the longitudinal end of the cavity.

In a preferred form, each retainer clip comprises:
an end couplable to the interior wall surface;
an exterior clip surface;
a first aperture for receipt of the elongate article, the first aperture extending in the longitudinal direction of the storage device; and
a first channel extending from the exterior clip surface to the first aperture, the retainer clip being deformable such that the first channel is configurable between an open position and a closed position;
wherein:
in the open position, the first channel allows for the passage of the elongate article into and out of the first aperture, and,
in the closed position, the first channel inhibits passage of any elongate article into and out of the first aperture.

In a preferred form, each retainer clip further comprises:
a second aperture for receipt of the elongate article, the second aperture extending in the longitudinal direction of the storage device; and
a second channel extending from the exterior clip surface to the second aperture, the retainer clip being deformable such that the second channel is configurable between an open position and a closed position;
wherein:
in the open position, the second channel allows for the passage of the elongate article into and out of the second aperture, and,
in the closed position, the second channel inhibits passage of any elongate article into and out of the second aperture.

In a preferred form, each retainer clip comprises:
an end couplable to the interior wall surface;
an exterior clip surface;
a first retention recess for receipt of the elongate article, the first retention recess extending in the longitudinal direction of the storage device; and
a first clasp pivotally coupled to the retainer clip, the first clasp moveable between an open position and a closed position;
wherein:
in the open position, the first clasp allows for the passage of the elongate article into and out of the first retention recess, and,
in the closed position, the first clasp closes the first retention recess thereby inhibiting passage of any elongate article into and out of the first retention recess.

In a preferred form, each retainer clip further comprises:
a second retention recess for receipt of the elongate article, the second retention recess extending in the longitudinal direction of the storage device; and
a second clasp pivotally coupled to the retainer clip, the second clasp moveable between an open position and a closed position;
wherein:
in the open position, the second clasp allows for the passage of the elongate article into and out of the second retention recess, and,
in the closed position, the second clasp closes the second retention recess thereby inhibiting passage of any elongate article into and out of the second retention recess.

In a preferred form, each retainer clip is detachably coupled to the interior wall surface.

In a preferred form, each retainer clip is formed of a first material and the wall is formed of a second material, the first material being softer than the second material.

In a preferred form, the storage device further comprises a handle or strap coupled to the exterior wall surface.

BRIEF DESCRIPTION OF DRAWINGS

Preferred embodiments of the invention will now be described, by way of examples only, with reference to the accompanying drawings, wherein like reference numerals refer to similar features throughout the figures, in which:

FIGS. 5-9 are views of a truncated portion of a wall section of the storage device of FIG. 1;

FIG. 16 is a fragmentary perspective view of the end portion of the storage device of FIG. 1 with cap sections;

FIGS. 17-22 are various views of a single cap section of FIG. 16 according to a first embodiment;

FIGS. 23-26 illustrate the cap sections of FIGS. 17-22 during sequential stages of being coupled to the end portions of the storage device of FIG. 1;

FIG. 27 is a perspective view of the storage device of FIG. 1 in the closed configuration with securing means engaged;

FIG. 28 is a perspective view of the storage device of FIG. 1 in the closed configuration with securing means disengaged;

FIGS. 29-30 are perspective views of the storage device of FIG. 1 in the open configuration;

FIGS. 62-64 is an end view of the storage device of FIGS. 40-42 in an open configuration;

FIGS. 71-74 are views of a truncated portion of a wall section of the storage device of FIGS. 68-70;

FIGS. 93-95 is an end view of the storage device of FIGS. 68-70 in the closed configuration;

FIGS. 99-104 are views of a handle according to second embodiment.

DESCRIPTION OF EMBODIMENTS

Figure 1:
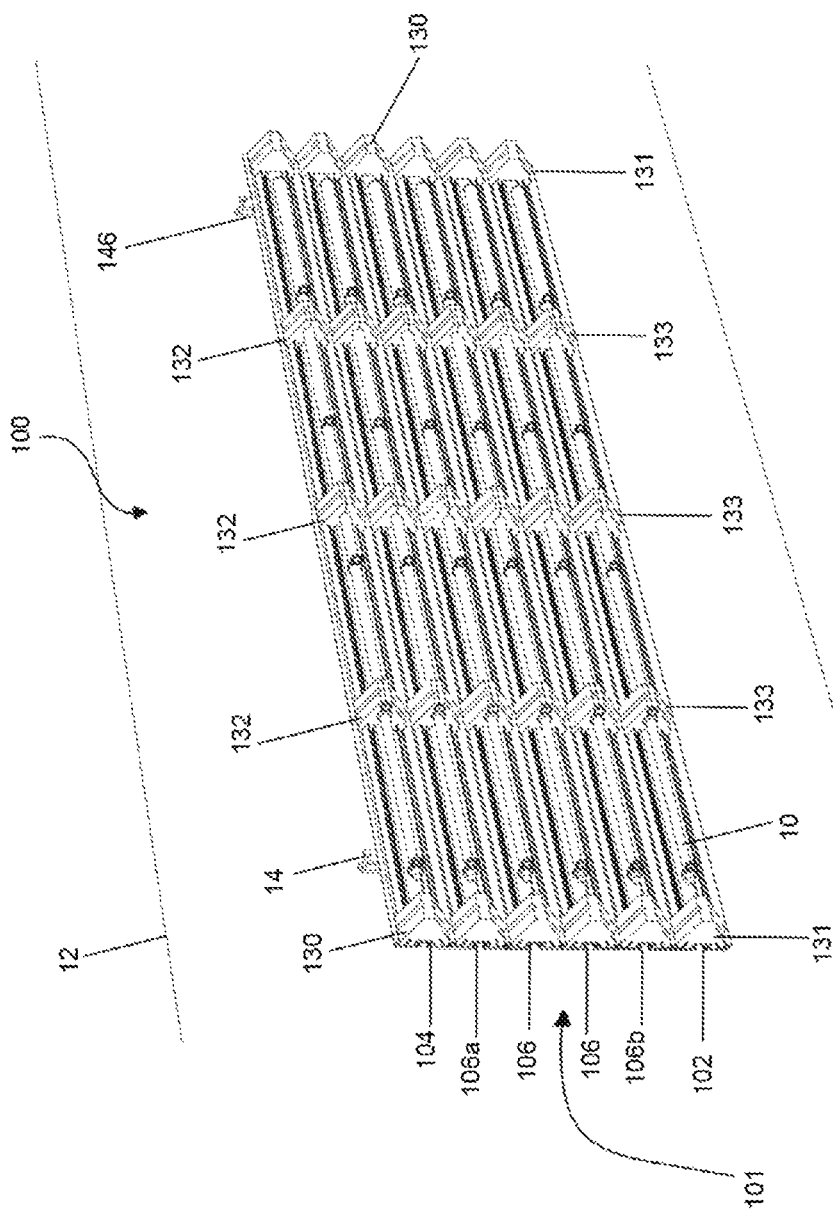
FIG. 1 is a perspective view of a first embodiment of a storage device in an open configuration.
Figure 2:
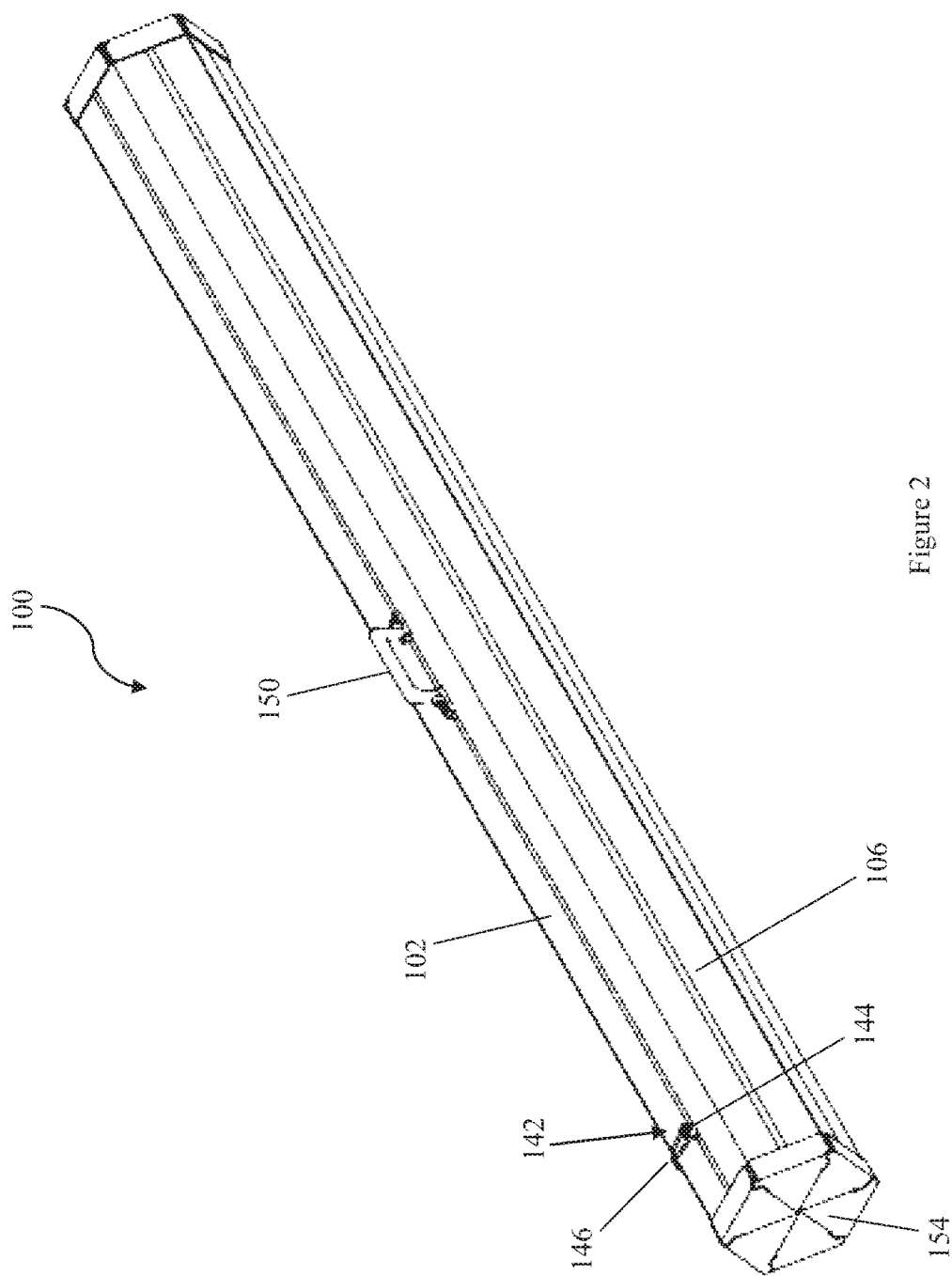
FIG. 2 is a perspective view of the storage device of FIG. 1 in a closed configuration.

FIGS. 1 and 2 show a storage device 100 for storing and/or transporting one or more fishing rods 10 according to a first embodiment, in an open configuration and a closed configuration, respectively.

It is understood that fishing rods 10 may comprise multiple fishing rod segments that interconnect to form a fishing rod 10. Accordingly, any further reference in the specification to "fishing rod(s) 10" will be understood as referring to either a complete fishing rod or a fishing rod segment.

The storage device 100 has a wall 101 having an interior surface and an exterior surface. In this embodiment, the wall 101 comprises six wall sections 102, 104, 106 with each wall section pivotally coupled to adjacent wall sections. It is also envisaged that the wall 101 may comprise a single wall section that is deformable between open and closed configurations, or any number of wall sections. It is further envisaged that the number of wall sections forming the wall 101 may be varied depending on the number of fishing rods 10 needing to be stored and/or transported in the storage device 100. The wall 101 is deformable between an open configuration and a closed configuration. In the closed configuration, the wall 101 defines a longitudinally extending cavity generally indicated by the reference numeral 152 (see FIG. 3). The wall sections are, for example, in the form of an extrusion formed from a metal/alloy (i.e. aluminium) or a hard plastic (e.g. polypropylene, high density polyethylene, etc.). It is also envisaged that the wall sections may be formed by injection moulding or from carbon fibre.

The storage device 100 also has multiple retainer clips 132 attached to the interior surface of the wall 101. The retainer clips 132 removably retain fishing rods 10 in a longitudinally extending orientation. In this embodiment, the retainer clips 132 are removable from the wall 101, however, it is also envisaged that the retainer clips 132 may be integrally formed with the wall 101. The retainer clips 132 are, for example, formed of a high-density foam (e.g. medium to high density polyurethane foam).

When the wall 101 is in the closed configuration, the retainer clips 132 and any fishing rods 10 being retained by the retainer clips 132 are located within the cavity 152. When the wall 101 is in the open configuration access is provided to the retainers clips 132 such that fishing rods 10 may be removed from and/or received by the retainer clips 132.

Referring to FIG. 1, the wall 101 comprises a first end wall section 102, a second end wall section 104 and multiple intermediate wall sections 106 disposed between the first and second end wall sections 102 and 104.

FIGS. 5-9 show a truncated portion of a representative wall section. The feature shown in dotted lines (discussed in detail below) forms part of the first end wall section 102 and each intermediate wall section 106, but does not form part of the second end wall section 104. Accordingly, it will be appreciated that, in the depicted embodiment, each wall section is identical, except for the second end wall section 104 which does not include the feature shown in dotted lines Each wall section is in the form of an extrusion having a uniform extrusion profile 123. The exterior wall surface 118 of each wall section has a longitudinal recess 122 extending the length of the wall section. The recess 122 forms a corresponding longitudinal protrusion 124 in the interior wall surface 120 of the wall section. The interior wall surface 120 further comprises a pair of angled projections 126. The longitudinal protrusion 124 together with the angled projections 126 define a mating channel 129 on either side of the longitudinal protrusion 124. Surfaces of each mating channel 129 have teeth 128 facing towards the exterior wall surface 118. The interior wall surface 120 and the exterior wall surface 118 together form the extrusion profile 123.

Figure 3:
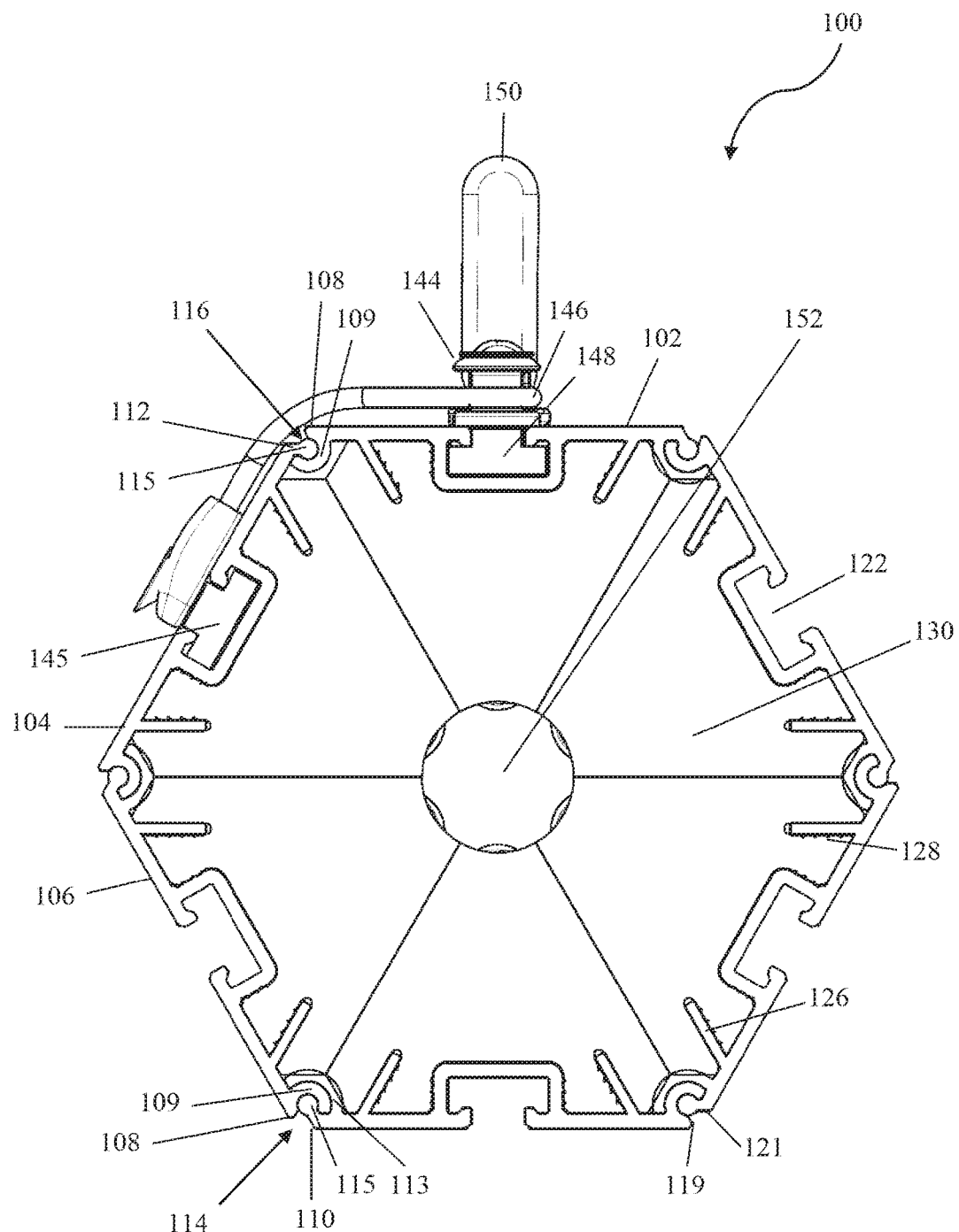
FIG. 3 is an end view of the storage device of FIG. 1 in the closed configuration.

Referring to FIG. 3, a first coupling profile 108 extends along a longitudinal first edge of each wall section. Apart from the second end wall section 104, a second coupling profile 110 extends along a longitudinal second edge of each wall section. For the second end wall section 104, a third coupling profile 112 extends along the longitudinal second edge.

The first coupling profile 108 comprises a first arcuate arm 109 and a first abutting surface 119, and the second coupling profile 110 comprises a second arcuate arm 113, a lip 115 and a second abutting surface 121. As will be appreciated from FIG. 3, the third coupling profile 112 is similar to the second coupling profile 110 but does not include the second arcuate arm 113. Referring to FIG. 5C, the second arcuate arm 113 and the lip 115 of the second coupling profile 110 define a slot 117. Accordingly, it will be appreciated that, in the embodiment depicted, each wall section can be manufactured identically with the second arcuate arm 113 being subsequently removed from one of the wall sections to produce the second end wall section 104.

Referring to FIG. 3, apart from the first end wall section 102, the first arcuate arm 109 of the first coupling profile 108 of each wall section is slidably received in the slot 117 of the second coupling profile 110 of an adjacent wall section to form a pivotal coupling 114 that is not readily releasable. The third coupling profile 112 of the second end wall section 104 releasbly engages the first coupling profile 108 of the first end wall section 102 to form a releasable coupling 116. It is envisaged, however, that the releasable coupling 116 may be formed by other means.

Referring to FIG. 1, the storage device 100 further comprises end elements 130 and retainer clips 132 according to a first embodiment (only one of each is labelled for clarity of illustration). Referring to FIGS. 10-15, each retainer clip 132 has an engaging end 134, an exterior clip surface 136 and an aperture 138. Extending from the exterior clip surface 136 to the aperture 138 is a channel 140. Referring to FIGS.

3 and 4, the end elements 130 are similar to the retainer clips 132 but do not include the aperture 138 and the channel 140.

In a preferred embodiment, the wall 101 is formed of a material that is harder than that of the material forming the end elements 130 and the retainer clips 132. The end elements 130 and the retainer clips 132 are formed of a material that allow them to be deformed to some degree. It is envisaged that the end elements 130 may be formed of the same, or different, material to that of the retainer clips 132. Accordingly, each retainer clip 132 is deformable such that the channel 140 is configurable between an open position and a closed position. When the channel 140 is in the closed position there may still be a gap in the channel 140. It will be appreciated, however, that when the channel 140 is in the closed position, any gap in the channel 140 will be narrow enough to inhibit passage of a fishing rod 10 into and out of the aperture 138.

Referring to FIG. 16, the storage device 100 may further comprise multiple cap sections 154. Referring to FIGS. 17-22, each cap section 154 has an external end surface 156, a projecting cover portion 157, an external flange 158, a void 159 and an internal cap surface 160. The external flange 158 and internal cap surface 160 together form a mating profile 162.

Referring to FIG. 2, the storage device 100 may further comprise one or more securing means 142 and a handle 150. Each securing means 142 comprises a lug 144 and a loop 146. It is also envisaged that the securing means 142 may be in the form of a folding clasp mechanism, or any other suitable fastening mechanisms. It is further envisaged that a carrying strap may be utilized in place of, or in combination with, the handle 150.

Referring to FIG. 3, each lug 144 and each loop 146 have an attachment key 148 to attach them to the exterior wall surface 118 of a wall section. Although not illustrated, the handle 150 also has an attachment key 148.

Assembly of the storage device 100 will now be discussed. Referring to FIG. 1, a pivotal coupling 114 couples each intermediate wall section 106 to adjacent intermediate wall sections 106, except for the two end intermediate wall sections 106a and 106b. A pivotal coupling 114 couples the intermediate wall section 106b to the first end wall section 102, and another pivotal coupling 114 couples the intermediate wall section 106b to the adjacent intermediate wall section 106. Similarly, a pivotal coupling 114 couples the intermediate wall section 106a to the second end wall section 104, and another pivotal coupling 114 couples the intermediate wall section 106a to the adjacent intermediate wall section 106. Together all the wall sections form the wall 101.

Figure 4:
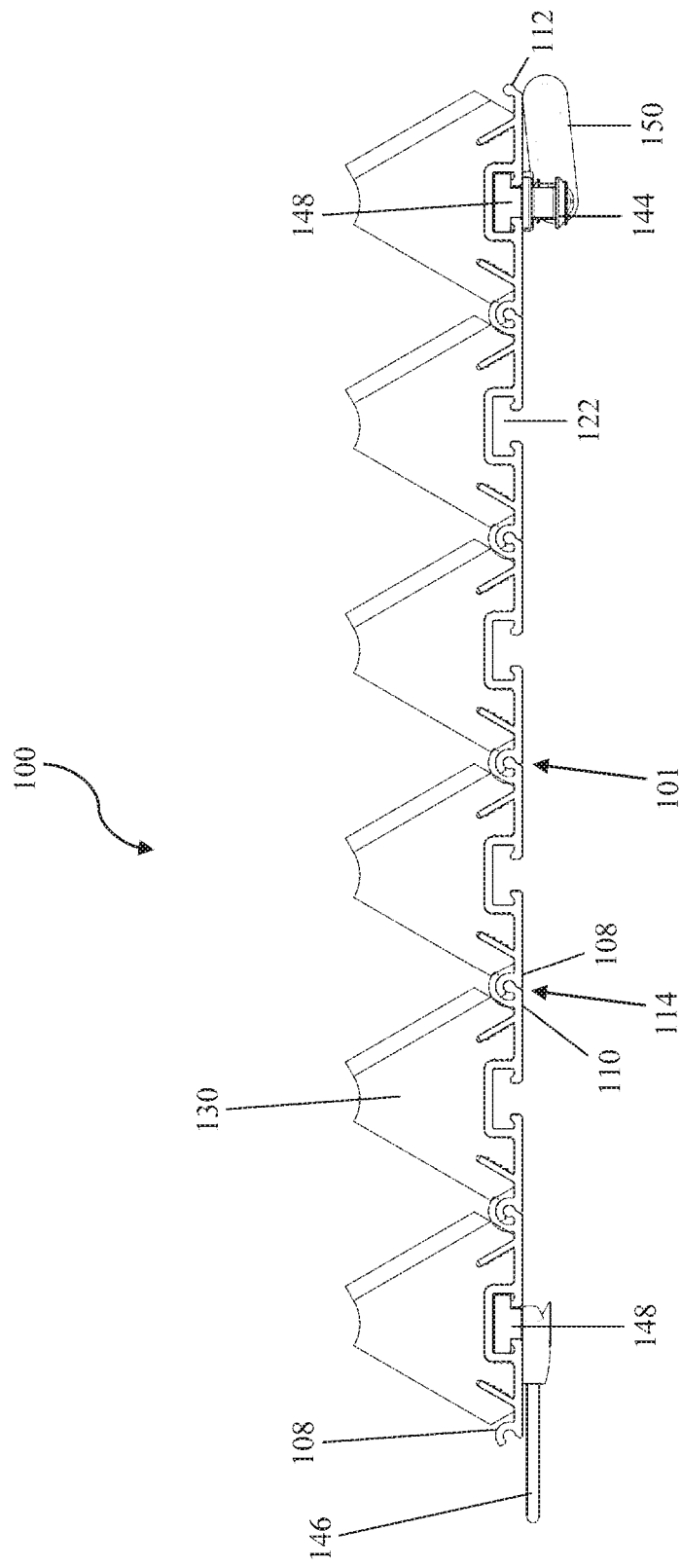
FIG. 4 is an end view of the storage device of FIG. 1 in the open configuration.
Figure 10:
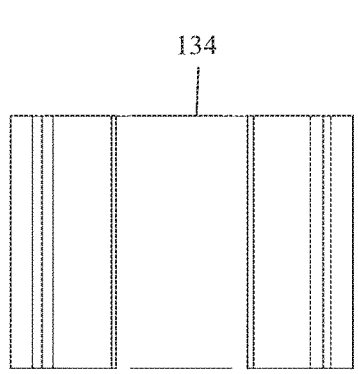
FIGS. 10-15 are views of a first embodiment of a retainer clip of the storage device of FIG. 1.
Figure 11:
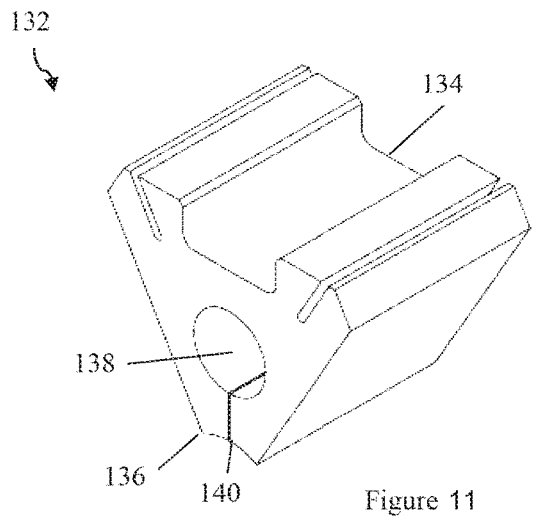

Referring to FIGS. 3 and 4, each pivotal coupling 114 allows the wall 101 to be deformed from an open configuration to a closed configuration. For each pivotal coupling 114, when the wall 101 is in the closed configuration, the first arcuate arm 109 of the first coupling profile 108 abuts the closed end of the slot 117 of the second coupling profile 110, and the second arcuate arm 113 of the second coupling profile 110 abuts the interior wall surface 120 of the adjacent wall section thereby limiting further pivotal movement of adjacent wall sections beyond the closed configuration. For each pivotal coupling 114, when the wall 101 is in the open configuration, the first abutting surface 119 of the first coupling profile 108 abuts the second abutting surface 121 of the second coupling profile 110 thereby limiting further pivotal movement of adjacent wall sections beyond the open configuration. Accordingly, it will be appreciated that the pivotal couplings 114 limit the pivotal movement of adjacent wall sections to between the open configuration and the closed configuration.

Referring to FIG. 3, the releasable coupling 116 releasably retains the wall 101 in the closed configuration. Referring to FIG. 4, the pivotal couplings 114 limit the pivotal movement of adjacent wall sections such that when the wall 101 is in the open configuration the wall 101 is at least substantially flat.

Figure 12:
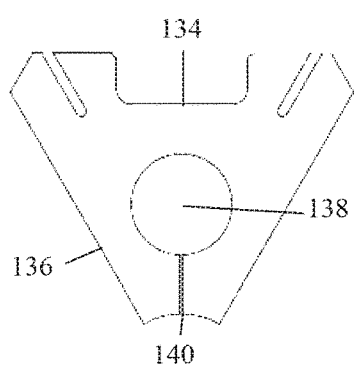
Figure 13:
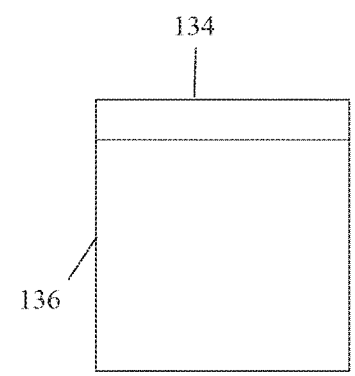
Figure 14:
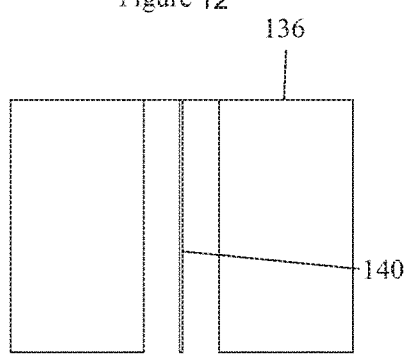
Figure 15:
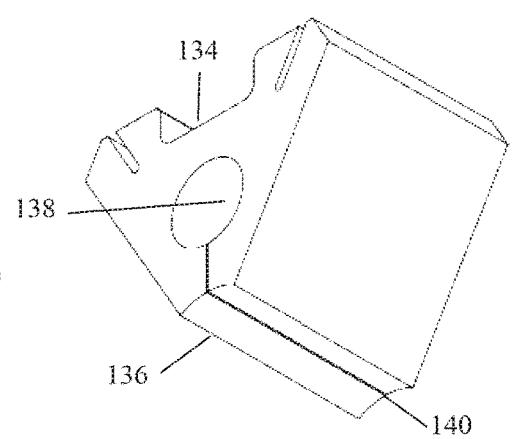

Referring to FIG. 1, coupled to the interior wall surface 120 at the ends of each wall section are the end elements 130, and coupled to the interior wall surface 120 between the end elements 130 are the retainer clips 132. As can be seen in FIGS. 7 and 12, the interior wall surface 120 and the engaging ends 134 of the end elements 130 and the retainer clips 132 have complimentary profiles. The end elements 130 and the retainer clips 132 are coupled to respective wall sections by mating the engaging ends 134 of each end element 130 and each retainer clip 132 with the interior wall surface 120 of the respective wall section. After each end element 130 and each retainer clip 132 are coupled to the interior wall surface 120 of a respective wall section, they can be moved to any desired position on the wall section by sliding them along the interior wall surface 120. It will be appreciated that each of the end elements 130 and the retainer clips 132 can be removed from the wall sections.

Referring to FIG. 1, the end elements 130 of each wall section are arranged to form transversely extending end element sets 131 at each longitudinal end of the wall 101. Similarly, the retainer clips 132 of each wall section are arranged to form transversely extending retainer clip sets 133 longitudinally spaced between the end element sets 131.

Referring to FIGS. 3 and 4, the teeth 128 of each mating channel 129 engage with the engaging ends 134 of each end element 130 and each retainer clip 132 to inhibit the end elements 130 and the retainer clips 132 being pulled away/off the interior wall surface 120.

The attachments keys 148 of the lug 144, the loop 146 and the handle 150 have a complimentary profile to that of the longitudinal recesses 122 of each wall section. As seen in FIG. 2, the attachment key 148 of each lug 144 is received by the longitudinal recess 122 of the first end wall section 102 thereby coupling each lug 144 to the first end wall section 102. Similarly, the attachment key 148 of each loop 146 is received by the longitudinal recess 122 of the second end wall section 104 thereby coupling each loop 146 to the second end wall section 104. The lug 144 and its respective loop 146 are moved along their respective longitudinal recesses 122 until they are aligned with each other thereby allowing the loop 146 to engage the lug 144. The attachment key(s) 148 of the handle 150 is received by the longitudinal recess 122 of the first end wall 102 thereby coupling the handle 150 to the first end wall section 102. It will be appreciated that the lug 144, loop 146 and handle 150 can be coupled to other wall sections.

Referring to FIGS. 7-22, it can be seen that the extrusion profile 123 of each wall section and the mating profile 162 of each cap section 154 are complimentary. Referring to FIG. 16, each cap section 154 is coupled to the longitudinal end of a wall section by mating the mating profile 162 of the cap section 154 to the longitudinal end of the wall section. It can be seen that the external flange 158 of each cap section 154 abuts the exterior wall surface 118 of the wall section to which it is coupled.

FIGS. 23-26 illustrate the adjacent cap sections 154a and 154c during sequential stages of being coupled to one of the longitudinal ends of the wall sections 106, and the adjacent cap sections 154b and 154d during sequential stages of being coupled to the other of the longitudinal ends of the wall sections 106. As will be appreciated from these figures, cap sections 154a and 154c are mirror images of the cap sections 154b and 154d.

Referring to FIG. 24, when the cap sections 154a and 154b are coupled to respective ends of one of the wall sections 106, the projecting cover portions 157 of each cap section 154a, 154b cover a respective end of a pivotal coupling 114 formed between adjacent wall sections 106. Referring to FIGS. 25-26, when the cap sections 154c and 154d are coupled to respective ends of the other of the wall sections 106, the projecting cover portions 157 of cap sections 154a and 154b are received in the voids 159 of the cap sections 154c and 154d, respectively.

As will be appreciated from FIG. 7 and FIGS. 23-26, when the wall 101 is in the closed configuration, the projecting cover portion 157 of the cap sections 154 coupled to either end of the wall section 104 will cover respective ends of the releasable coupling 116. As will also be appreciated from these figures, when the wall 101 is in the open configuration, the projecting cover portion 157 of the cap sections 154 coupled to either end of the wall section 104 will cover respective ends of the third coupling profile 112.

Use of the storage device 100 will now be discussed. Referring to FIG. 1, when the wall 101 is in the open configuration, access is provided to the retainer clips 132 thereby allowing fishing rods 10 to be received and removed from the retainer clips 132. A fishing rod 10 is received by the retainer clips 132 of one wall section by deforming each retainer clip 132 coupled to that wall section to expand each channel 140 into the open position. In the open position, the channel 140 allows passage of a fishing rod 10 into and out of the aperture 138 of the retainer clip 132. In the closed position, the channel 140 inhibits passage of a fishing rod 10 into and out of the aperture 138 of the retainer clip 132. As can be seen from FIG. 1, each fishing rod 10 is held in a longitudinally extending orientation. When the wall 101 is in the open configuration, the loops 146 may engage with nails 14 in a surface 12 (e.g. of a wall) to thereby suspend the storage device 100 on the surface 12.

Referring to FIG. 3, deforming the wall 101 to the closed configuration is achieved by pivotally moving each wall section until the first coupling profile 108 of the first end wall section 102 engages with the third coupling profile 112 of the second end wall section 104 thereby forming the releasable coupling 116. When the wall 101 is in the closed configuration, the retainer clips 132 and any fishing rods 10 retained by the retainer clips 132 are located within the cavity 152.

In the closed configuration, adjacent end elements 130 in each end element set 131 and adjacent retainer clips 132 in each retainer clip set 133 abut to provide support to the storage device 100, respectively. It will be appreciated that the end elements 130 prevent any fishing rods 10 held by the retainer clips 132 from slipping out of the storage device 100 in a longitudinal direction when the wall 101 is in either of the open or closed configuration. When the wall 101 is in the closed configuration, each end element set 131 substantially closes one longitudinal end of the cavity 152.

As stated above, the releasable coupling 116 releasably retains the wall 101 in the closed configuration. Once the releasable coupling 116 has been formed, each loop 146 extends across the releasable coupling 116 to engage a respective lug 144. The securing means 142 releasably secures the wall 101 in the closed configuration such that if the releasable coupling 116 separates inadvertently, the wall 101 will not of its own accord deform to the open configuration.

Referring to FIG. 16, when the wall 101 is in the closed configuration, each of the cap sections 154 coupled to one of the longitudinal ends of each wall section cooperate to close the longitudinal end of the cavity 152. The cap sections 154 prevent foreign objects entering the cavity 152 which may damage the fishing rods 10 held by the storage device 100 when the wall 101 is in the closed configuration. The cap sections 154 also prevent damage to the ends of the wall sections. It is envisaged that the storage device 100 may include the end elements 130 without the cap sections 154, or the cap sections 154 without the end elements 130.

FIG. 27 shows the storage device 100 in the closed configuration whereby the releasable coupling 116 is retaining the wall 101 in the closed configuration and the loops 146 are engaged with respective lugs 144 thereby securing the wall 101 in the closed configuration. In FIG. 28, the loops 146 have been separated from their respective lugs 144 and the releasable coupling 116 may now be decoupled. FIGS. 29-30 show the wall 101 in the open configuration after the releasable coupling 116 has been decoupled and the wall sections allowed to pivotally move to the open configuration.

Figure 31:
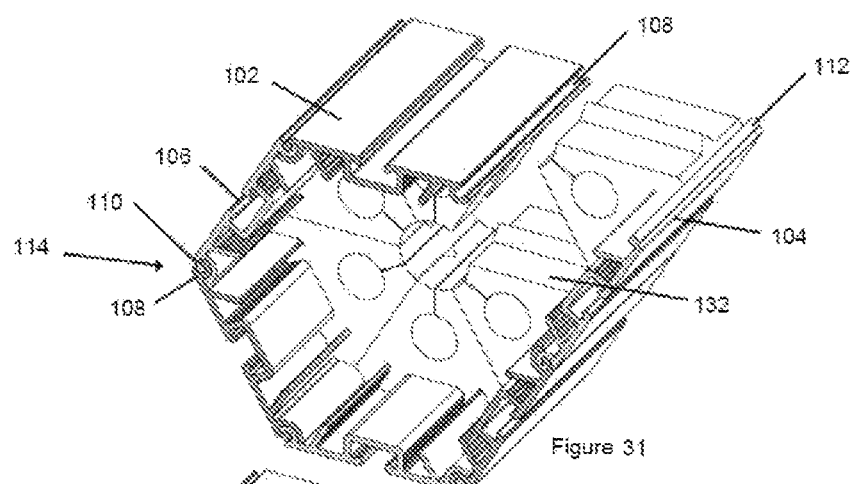
FIGS. 31-33 illustrate the final stages of closing the storage device of FIG. 1.
Figure 32:
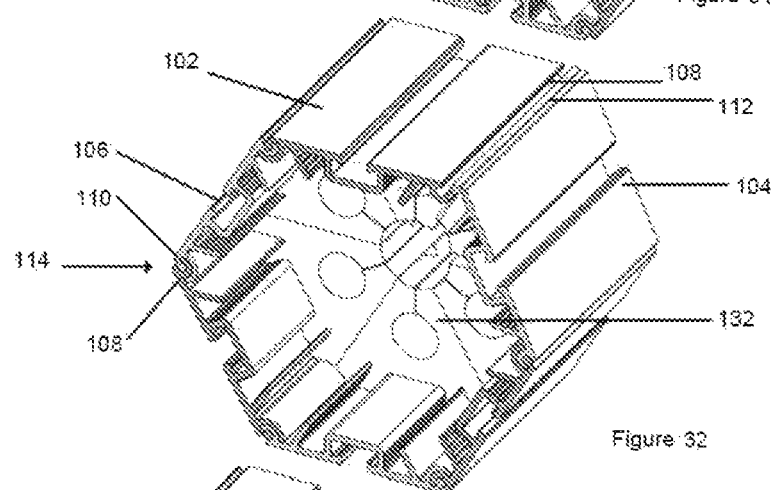
Figure 33:
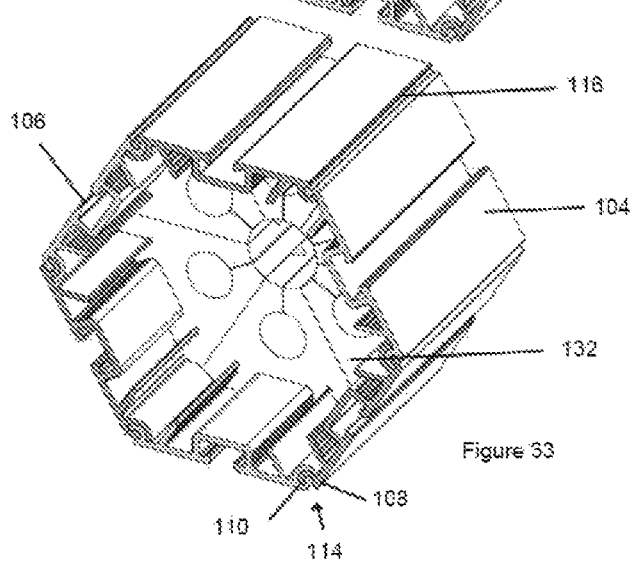

FIGS. 31-33 show the final stages of deforming the wall 101 to the closed configuration. In FIG. 31, each wall section of the wall 101 has been pivotally moved to their respective closed configuration position, except for second end wall section 104. As can be seen in this figure, the first coupling profile 108 of the first end wall section 102 is distal from the third coupling profile 112 of the second end wall section 104. In FIG. 32, the second end wall section 104 has been pivotally moved such that the first coupling profile 108 of the first end wall section 102 is proximate the third coupling profile 112 of the second end wall section 104. FIG. 33 shows the first coupling profile 108 of the first end wall section 102 engaging the third coupling profile 112 of the second end wall section 104 to form the releasable coupling 116. It will be appreciated that by decoupling the releasable coupling 116 and performing the above steps in the reverse order will deform the wall 101 from the closed configuration to the open configuration.

Each wall section can be decoupled from an adjacent wall section by decoupling a respective pivotal coupling 114. This allows wall sections to be replaced if they become damaged, or to increase/decrease the number of wall sections forming the wall 101. If more fishing rods 10 are required to be stored and/or transported in the storage device 100, more intermediate wall sections 106 can be coupled together to meet the desired requirement. However, if less fishing rods are required to be stored and/or transported in the storage device 100, intermediate wall sections 106 can be removed to meet the desired requirement.

As will be appreciated, increasing/decreasing the number of wall sections of the wall 101 will change the shape of the wall 101 when it is in the closed configuration. Accordingly, the end elements 130 and the retainer clips 132 may be interchanged depending on the number of wall sections present. This allows for adjacent end elements 130 and retainer clips 132 of respective end element sets 131 and retainer clip sets 133 to abut to provide support to the storage device 100, respectively, when a wall 101 containing any number of wall sections is in the closed configuration.

Figure 34:
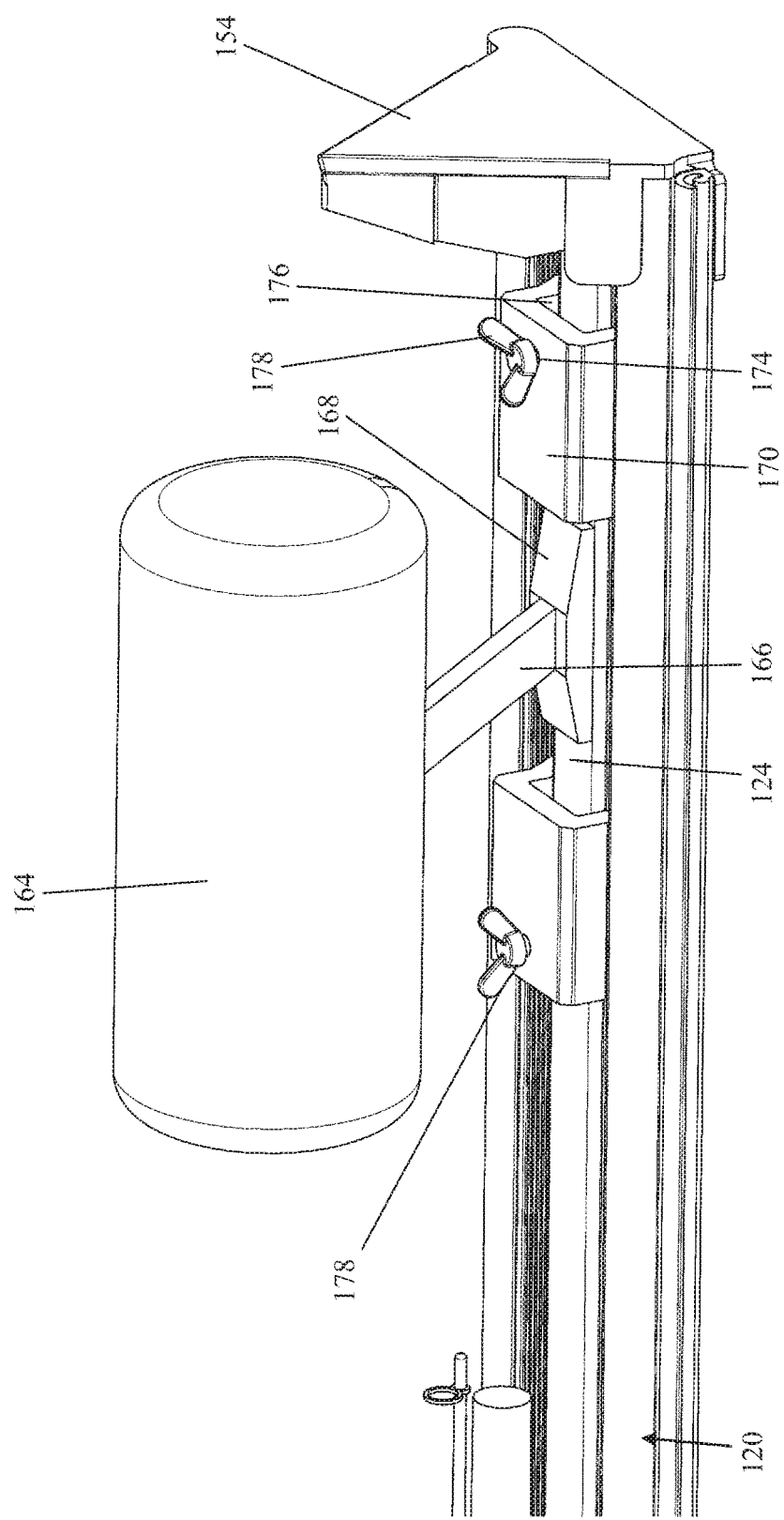
FIG. 34 is perspective view of a fishing reel removably coupled to the storage device of FIG. 1.
Figure 35:
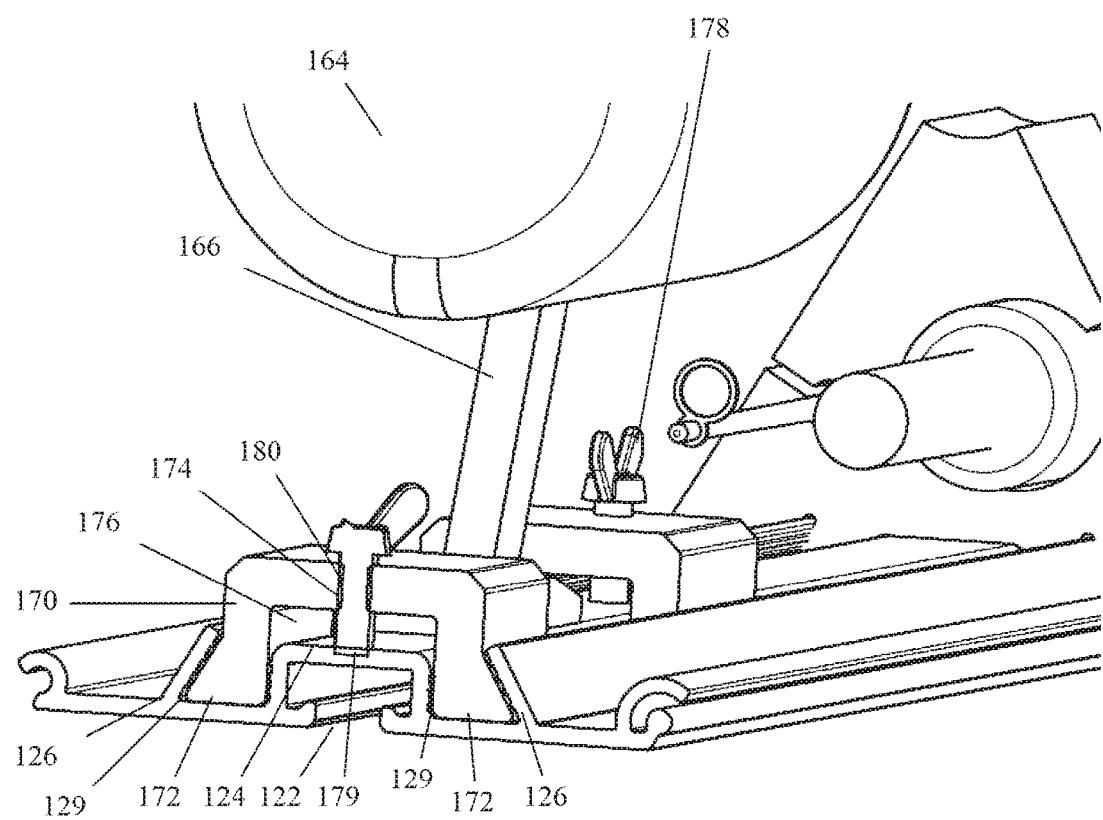
FIG. 35 is a partial section view of FIG. 34.

FIGS. 34 and 35 show a fishing reel 164 removably coupled to one of the wall sections 102, 104, 106. The reel 164 has a stem portion 166 and a pair of engaging flanges 168. The reel 164 is coupled to the wall section by a pair of securing brackets 170 and fasteners 178.

Referring to FIG. 35, each securing bracket 170 has pair of enlarged feet 172 and a threaded aperture 174. It can be seen that each foot 172 has a complimentary profile to that of one of the mating channels 129 of the wall section. Each fastener 178 has an end portion 179, and a threaded portion 180 configured to engage with the threaded aperture 174 of one of the securing brackets 170.

Coupling of the fishing reel 164 to the wall section 106 will now be discussed. Each foot 172 of each securing bracket 170 is slidably received by a respective mating channel 129 of the wall section thereby slidably coupling each securing bracket 170 to the wall section. When coupled to the wall section, each securing means 170 defines a passage 176 with the longitudinal protrusion 124 of the wall section. The engaging flanges 168 of the fishing reel 164 are positioned between two securing brackets 170 such that the engaging flanges 168 abut the longitudinal protrusion 124 of the wall section. Each securing bracket 170 slides along the wall section until each engaging flange 168 of the fishing 164 is received in a passage 176 defined by a respective securing bracket 170.

After the securing brackets 170 are in position, each fastener 178 is inserted into a threaded aperture 174 of a respective securing bracket 170 such that the threaded portion 180 of the fastener 178 threadably engages the threaded aperture 174. Each fastener 178 is rotated until the end portion 179 of the fastener 178 passes through the respective securing bracket 170 and abuts the longitudinal protrusion 124. Once the end portion 179 of the fastener 178 abuts the longitudinal protrusion 124, tightening the fastener 178 further forces the securing bracket 170 away from the wall section 106 such that the feet 172 of the securing bracket 170 are securably engaged within respective mating channels 129 thereby securing the securing bracket 170 and the fishing reel 164 in place along the wall section. It is envisaged that multiple fishing reels 164 can be removably coupled to any of, and anywhere along, the wall sections of the storage device 100.

It is also envisaged that small storage boxes, such as tackle boxes, may also be removably coupled to the wall sections in a similar manner to that of the fishing reels 164 described above. It is further envisaged that a combination of fishing reels 164 and storage boxes may be removably coupled to the wall sections of the storage device 100. When the wall 101 is in the closed configuration, any fishing reels 164 and/or storage boxes removably coupled to the wall sections are located within the cavity 152.

Figure 36:
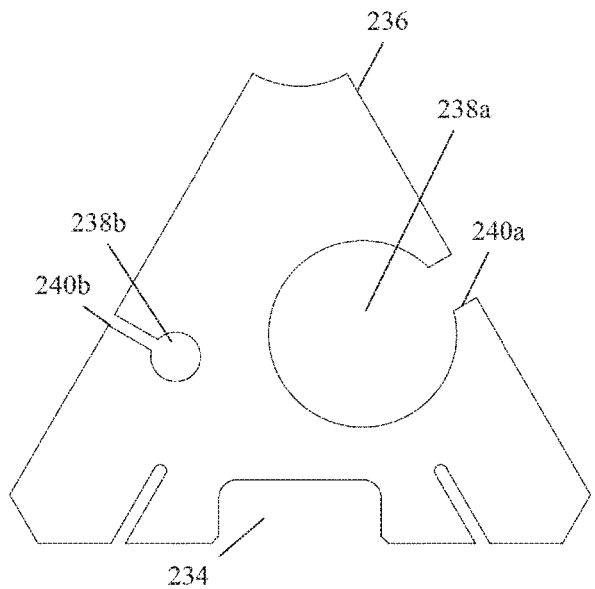
FIGS. 36-37 are views of a second embodiment of a retainer clip.
Figure 37:
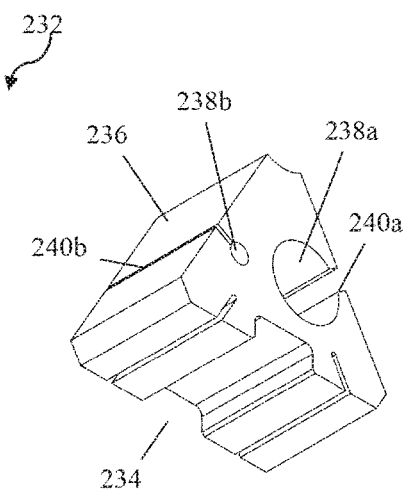

FIGS. 36-37 show a retainer clip 232 according to a first modification of the retainer clip 132 for use with the storage device 100. Retainer clip 232 is similar to retainer clip 132 but has two apertures 238a and 238b. Each aperture 238a and 238b has a channel 240a and 240b, respectively. It will be appreciated that retainer clip 232 is capable of retaining two fishing rods 10, each in a respective aperture 238a, 238b. Features of the retainer clip 232 that are identical or equivalent to those of the retainer clip 132 are provided with reference numerals that are equivalent to those of the retainer clips 132 but incremented by 100. For features that are identical between the retainer clip 132 and the retainer clip 232, it will be appreciated that the above description of these features in relation to the retainer clips 132 is also applicable to the corresponding identical/equivalent features found in the retainer clip 232. Accordingly, the identical features between the retainer clip 132 and the retainer clip 232 will not again be described in relation to the retainer clip 232 as these features of the retainer clip 232 have already been described above with respect to the retainer clip 132.

Figure 38:
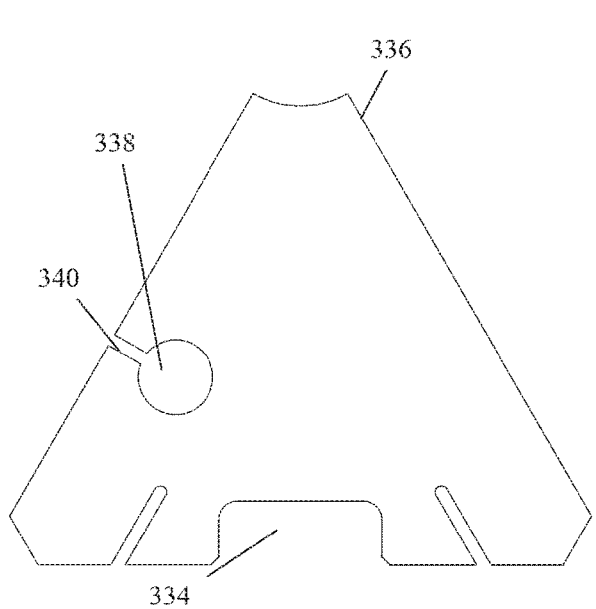
FIGS. 38-39 are views of a third embodiment of a retainer clip.
Figure 39:
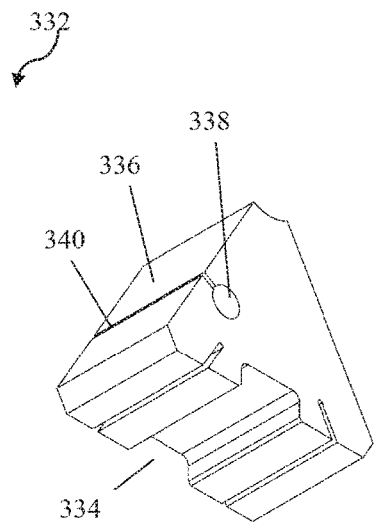

FIGS. 38-39 show a retainer clip 332 according to a second modification of the retainer clip 132 for use with the storage device 100. Retainer clip 332 is similar to retainer clip 132 but only has a single offset aperture 338. The aperture 338 has a corresponding channel 340. Features of the retainer clip 332 that are identical or equivalent to those of the retainer clip 132 are provided with reference numerals that are equivalent to those of the retainer clips 132 but incremented by 200. For features that are identical between the retainer clip 132 and the retainer clip 332, it will be appreciated that the above description of these features in relation to the retainer clips 132 is also applicable to the corresponding identical/equivalent features found in the retainer clip 332. Accordingly, the identical features between the retainer clip 132 and the retainer clip 332 will not again be described in relation to the retainer clip 332 as these features of the retainer clip 332 have already been described above with respect to the retainer clip 132.

It is envisaged that any number and/or combination of retainer clips 132, 232 and 332 may be coupled to the wall 101 of the storage device 100 in order to meet a particular need of a user.

Figure 40:
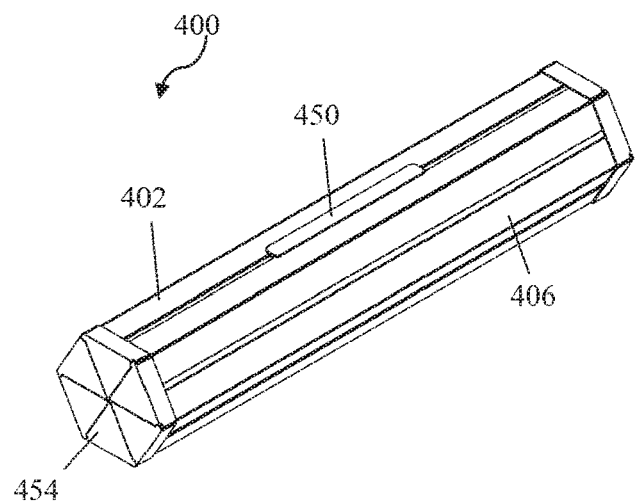
FIGS. 40-42 are views of a second embodiment of a storage device in a closed, partially open and open configuration, respectively.
Figure 41:
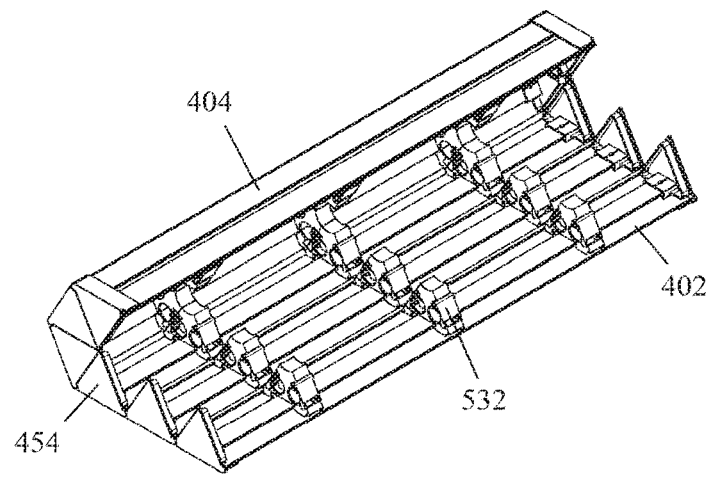
Figure 42:
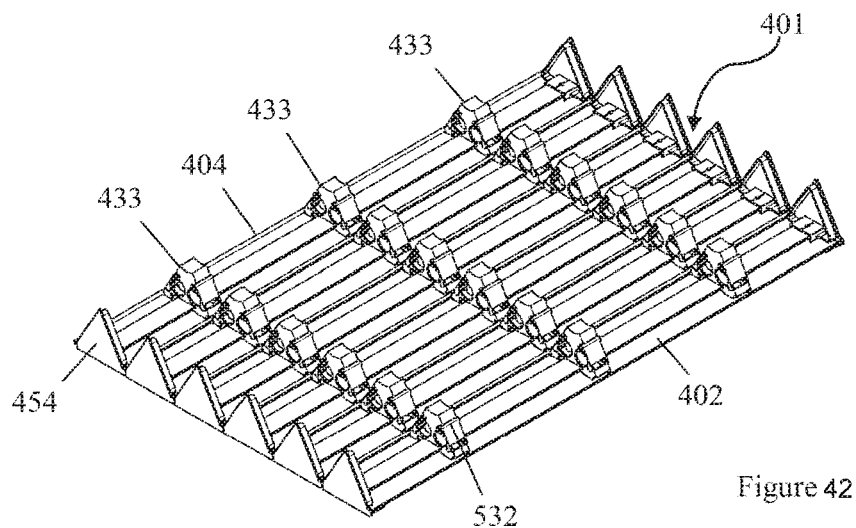

FIGS. 40-42 show a storage device 400 for storing and/or transporting one or more fishing rods 10 according to a second embodiment in a closed configuration, partially open configuration, and an open configuration, respectively. The storage device 400 is similar to the storage device 100. However, the storage device 400 differs from the storage device 100 in that the wall sections 402, 404, 406 that form the wall 401 of the storage device 400 have a different extrusion profile 423. The storage device 400 also has different end caps 454 and retainer clips 532, and does not have the end elements 130 of the storage device 100.

Features of the storage device 400 that are identical or equivalent to those of the storage device 100 are provided with reference numerals that are equivalent to those of the storage device 100 but incremented by 300. For features that are identical between the storage device 100 and the storage device 400, it will be appreciated that the above description of these features in relation to the storage device 100 is also applicable to the corresponding identical/equivalent features found in the storage device 400. Accordingly, the identical features between the storage device 100 and the storage device 400 will not again be described below in relation to the storage device 400 as these features of the storage device 400 have already been described above with respect to the storage device 100.

Figure 43:
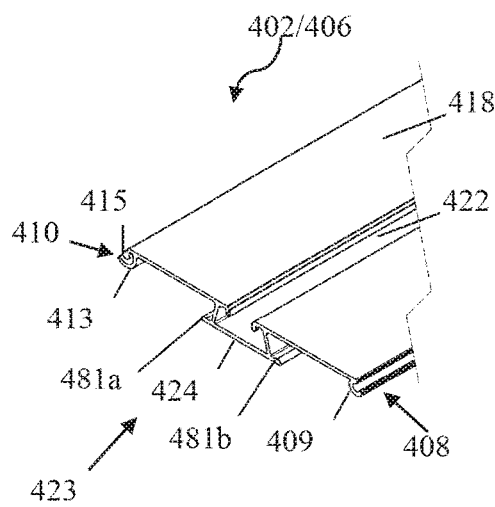
FIGS. 43-46 are views of a truncated portion of a wall section of the storage device of FIGS. 40-42.
Figure 44:
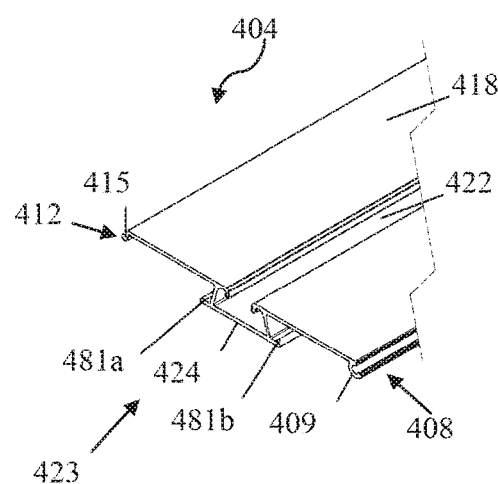
Figure 45:
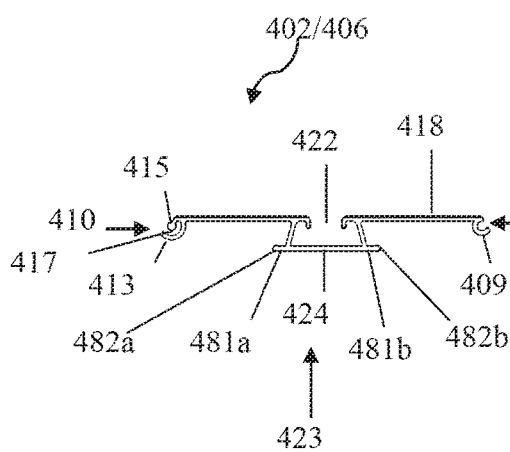
Figure 46:
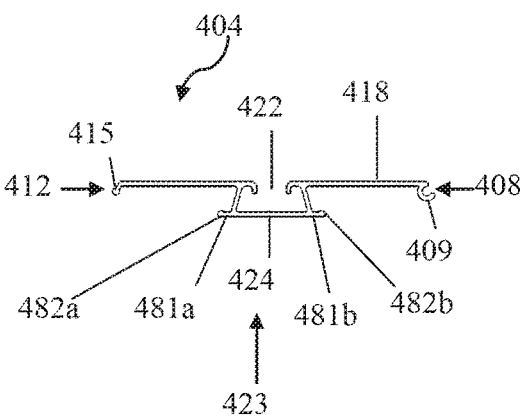
Figure 47:
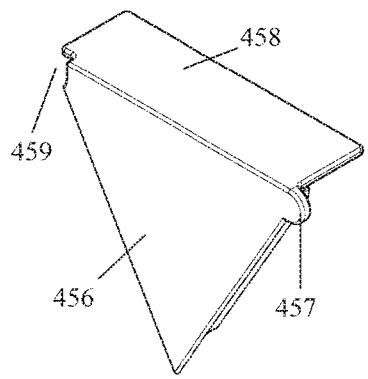
FIGS. 47-50 are various views of a single cap section of the storage device of FIGS. 40-42.
Figure 48:
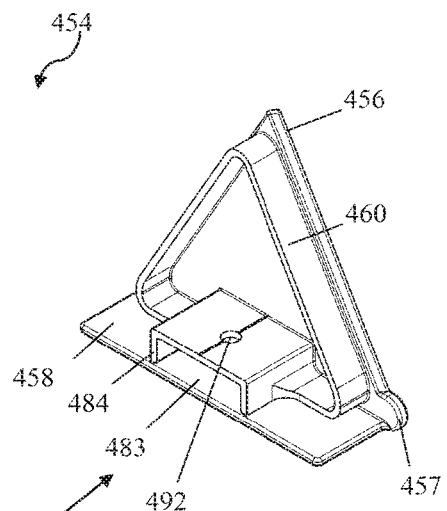
Figure 49:
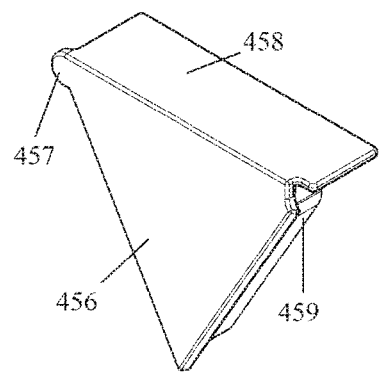
Figure 50:
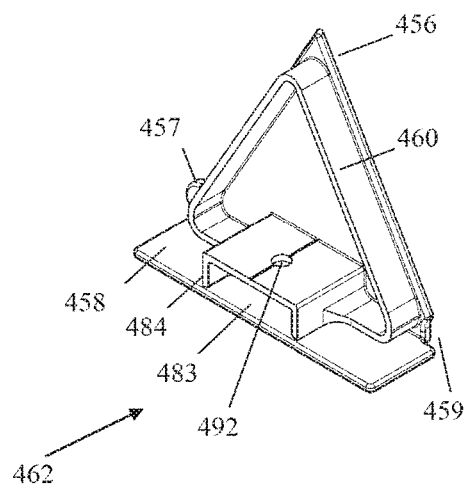

FIGS. 43-44 show a truncated portion of the wall sections 402/406, and FIGS. 45-46 show a truncated portion of the wall section 404. The wall sections 402, 404, 406 are similar to the wall sections 102, 104, 106 of the storage device 100, respectively, but do not include the angled projections 126 of the wall sections of the storage device 100.

The wall sections 402, 404, 406 of the storage device 400 further comprise a first flange 481a and a second flange 481b extending along a respective longitudinal edge of the longitudinal protrusion 424. The first flange 481a and the second flange 481b have a lip 482a and a lip 482b, respectively. Each of the lips 482a and 482b extend the length the first flange 481a and the second flange 482b, respectively.

FIGS. 47-50 show a cap section 454 for use with the storage device 400. The cap section 454 is similar to the cap section 154 of the storage device 100. The internal surface 460 of the cap section 454 comprises a space 483 defined by a portion 484. A hole 492 extends through the portion 484.

FIGS. 51-54 show a retainer clip 532 for use with the storage device 400. The retainer clip 532 is similar to the retainer clip 232. However, the retainer clip 532 does not have the channels 240a and 240b of the retainer clip 232, but instead has a first clasp 585a and a second clasp 585b that close a first retention recess 596a and a second retention recess 596b, respectively. Further, the engaging end 534 of the retainer clip 532 differs from the engaging end 234 of the retainer clip 232. It is envisaged that the retainer clips 532 may be formed from the same material as the wall sections 402, 404, 406 or any other suitable material. It is also envisaged that the retainer clips 532 may be formed integrally with the wall sections 402, 404, 406, apart from the first clasp 585a and the second clasp 585b that would need to be formed separately.

Features of the retainer clip 532 that are identical or equivalent to those of the retainer clip 232 are provided with reference numerals that are equivalent to those of the retainer clips 232 but incremented by 300. For features that are identical between the retainer clip 232 and the retainer clip 532, it will be appreciated that the above description of these features in relation to the retainer clips 232 is also applicable to the corresponding identical/equivalent features found in the retainer clip 532. Accordingly, the identical features between the retainer clip 232 and the retainer clip 532 will not again be described below in relation to the retainer clip 532 as these features of the retainer clip 532 have already been described above with respect to the retainer clip 232.

The engaging profile 534 of the retainer clip 532 is partially defined by a first recess 583a and a second recess 583b. The first recess 583a has a slit 584a and the second recess 583b has a slit 584b. It can be seen that the slit 583a faces in the opposite direction to that of slit the 583b. The first recess 583a and the second recess 583b have a width substantially equal to the width of the longitudinal protrusion 424 of the wall sections 402, 404 and 406.

Figure 51:
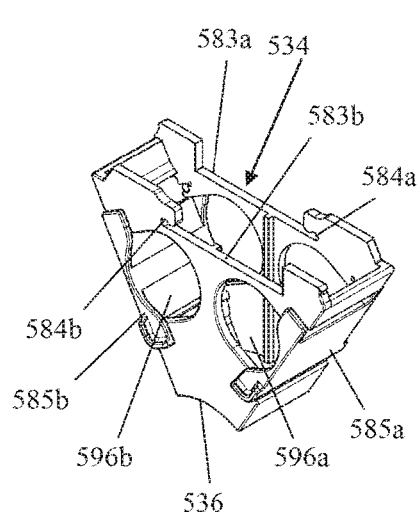
FIGS. 51-54 are views of a third embodiment of a retainer clip for use with the storage device of FIGS. 40-42.
Figure 52:
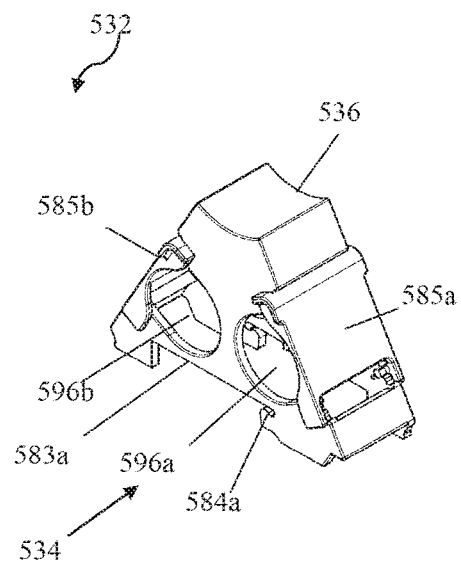
Figure 53:
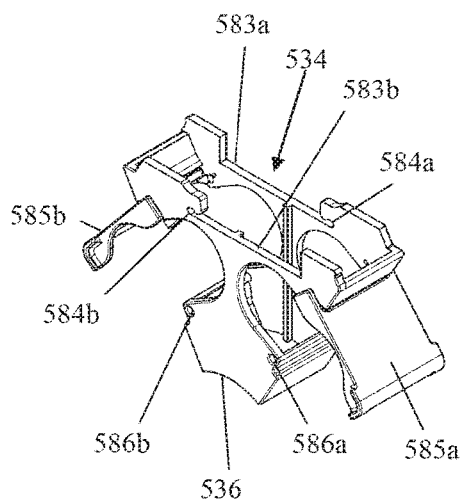
Figure 54:
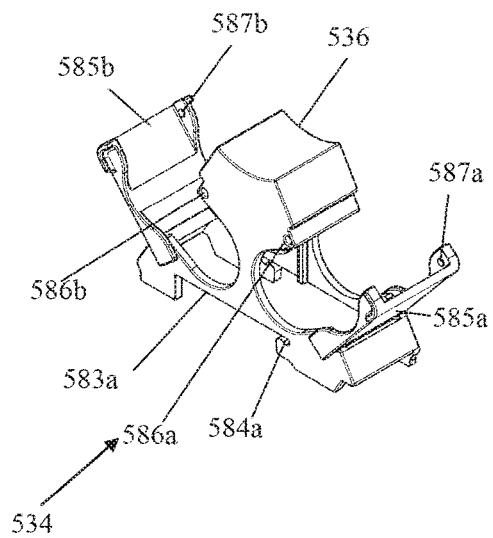

The first clasp 585a and the second clasp 585b are pivotally coupled to the retainer clip 532, and are movable between an open position and a closed position. Referring to FIGS. 51-52, in the closed position, the first clasp 585a and the second clasp 585b close the first retention recess 596a and the second retention recess 596b, respectively. Referring to FIGS. 53-54, in the open position, the first clasp 585a and the second clasp 585b allow access to the first retention recess 596a and the second retention recess 596b, respectively.

The retainer clip 532 has a first pair of depressions 586a and a second pair of depressions 586b. The first clasp 585a has a pair of bumps 587a, and the second clasp 585b has a pair of bumps 587b. In the closed position, the pair of bumps 587a are snap-fittingly received in a respective one of the pair of depressions 586a, thereby securing the first clasp 585a in the closed position. Similarly, the pair of bumps 587b are snap-fittingly received in a respective one of the pair of depressions 586b, thereby securing the second clasp 585b in the closed position.

It will be appreciated that the retainer clips 532 may be used with the storage device 100 by replacing the engaging end 534 of the retainer clip 532 with an engaging end that is generally identical to the engaging end 134 of the retainer clip 132.

Assembly of the storage device 400 will now be discussed. It will be appreciated that assembly of the storage device 400 is substantially similar to that of the storage device 100. Accordingly, aspects of assembly of the storage device 400 that are identical to that of the storage device 100 will not again be described below as they have already been described above with respect to the storage device 100.

Figure 55:
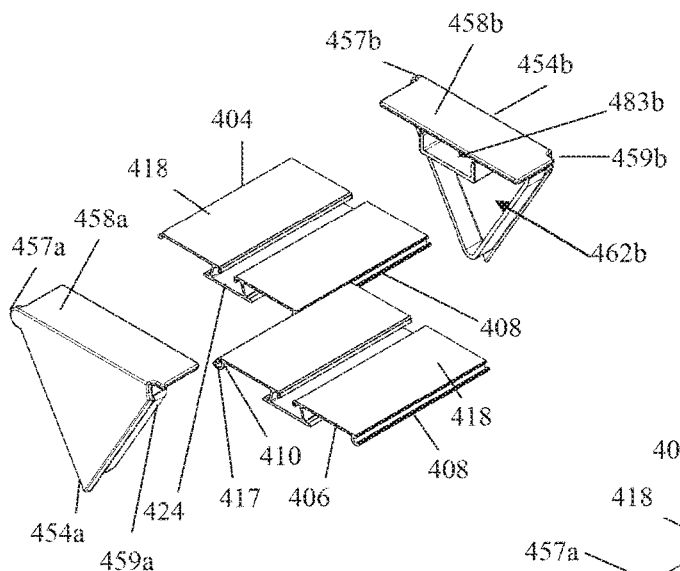
FIGS. 55-58 illustrate the cap sections of FIG. 47-50 during sequential stages of being coupled to end portions of the storage device of FIGS. 40-42.
Figure 56:
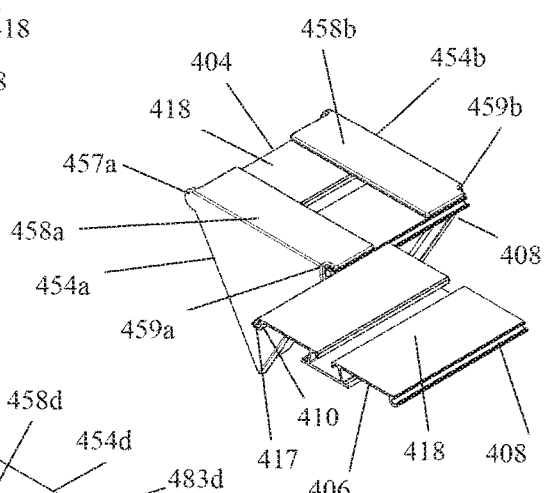

Referring to FIG. 55, cap sections 454a and 454b are coupled to respective ends of the longitudinal wall section 404 by mating the mating profile 462a and 462b of the respective cap sections 454a and 454b to the longitudinal ends of the wall section 404, respectively. Referring to FIG. 20B, it can be seen that the external flanges 458a and 458b of the respective caps sections 454a and 454b abut the exterior wall surface 418 of the wall section 404. When the cap sections 454a and 454b are coupled to respective longitudinal ends of the wall section 404, the longitudinal protrusion 424 of the wall section 402, 404, 406 is received within a respective space 483a and 483b of the cap sections 454a and 454b.

Figure 57:
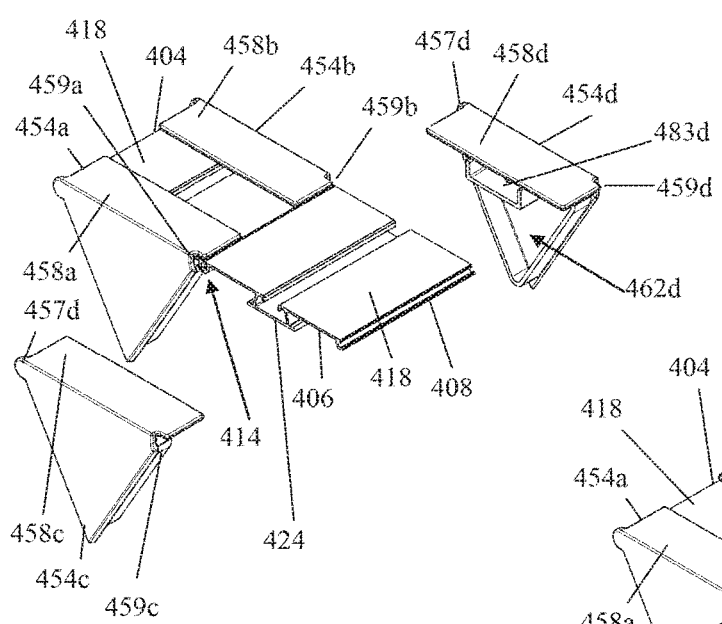
Figure 58:
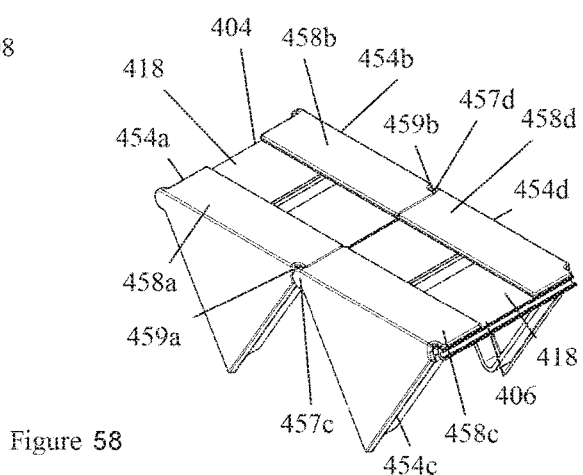

The first coupling profile 408 of the wall section 404 is inserted into the slot 417 of the second coupling profile 410 of the wall section 406 at one longitudinal end of the wall section 406. The wall sections 404 and 406 are then moved relative to each other in a longitudinal direction until the longitudinal ends of the wall section 404 are aligned with the longitudinal ends of the wall section 406, thereby forming the pivotal coupling 414 (see FIG. 57). Subsequently, cap sections 454c and 454d are coupled to a respective longitudinal end of the wall section 406 in the same manner that cap sections 454a and 454b were coupled to the wall section 404. It will be appreciated that the remaining wall sections 402, 406 are assembled in that same manner to that described above to form the wall 401, and that the remaining cap sections 454 are coupled to the remaining wall sections 402, 406 in the same manner to that described (see FIGS. 62-64). Referring to FIG. 62-64, it can be seen that a pivotal coupling 414 is formed between each adjacent wall section 402, 404 and 406. It will also be appreciated that the above method is used to assemble the wall 101 of the storage device 100 and couple the caps sections 154 to the wall sections 102, 104, 106 of the storage device 100.

The longitudinal protrusion 424 of each wall section 402, 404, 406 has a bump (not illustrated) proximate each longitudinal end of the wall section 402, 404, 406. When the cap sections 454 are coupled to respective longitudinal ends of the wall sections 402, 404, 406, each bump is snap-fittingly received within the hole 492 of a respective cap section 454, thereby securing the cap sections 454 to a respective longitudinal end of the wall sections 402, 404, 406.

Referring to FIG. 20D, when the cap sections 454 have been coupled to respective wall sections 402, 404, 406, the projecting cover portion 457 of a cap section 454 is received in the void 459 of an adjacent cap section 454. The cover portions 457 also cover a respective end of a pivotal coupling 414 formed between adjacent wall sections 402, 404, 406.

Figure 59:
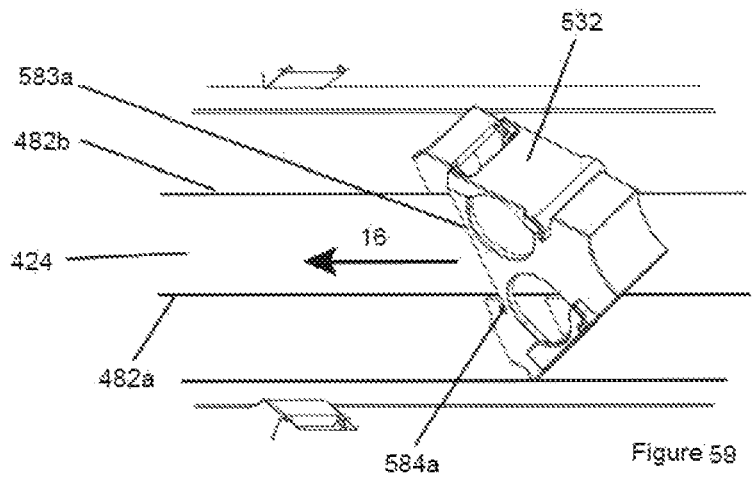
FIGS. 59-61 illustrate the retainers clips of FIGS. 55-58 during sequential stages of being coupled to the interior surface of a wall section of the storage device of FIGS. 40-42.
Figure 60:
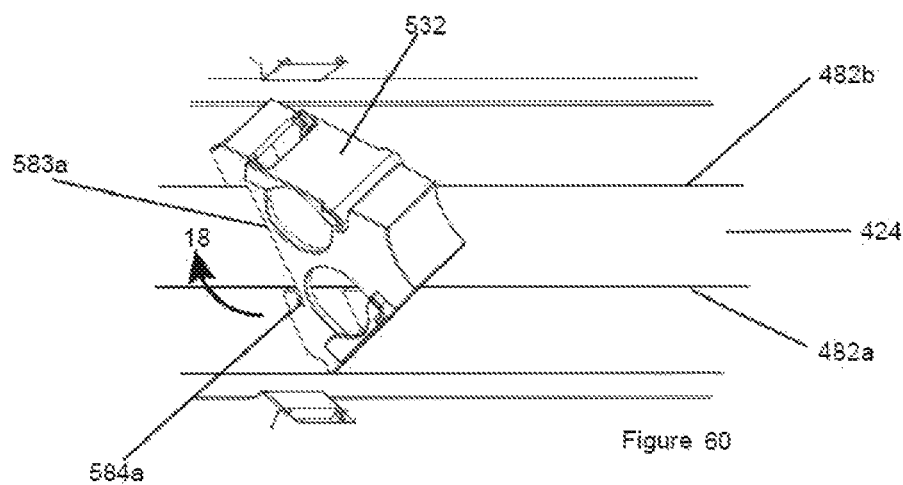
Figure 61:
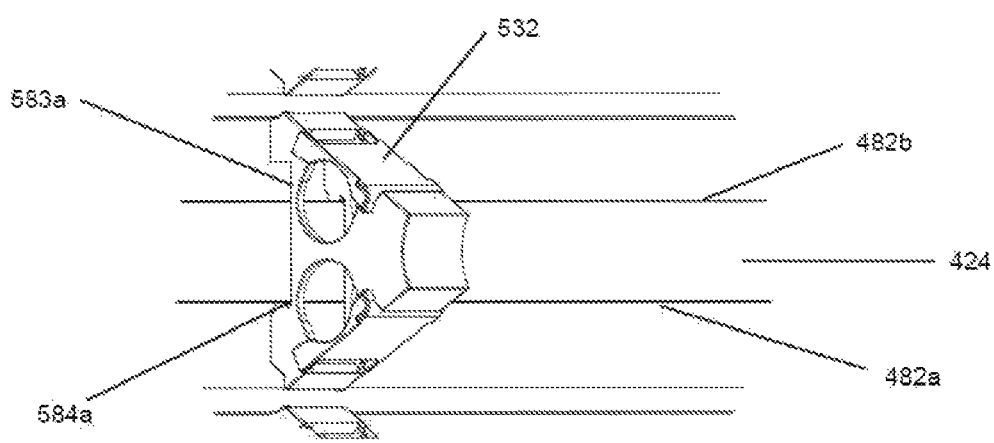

Referring to FIGS. 59-61, the retainer clips 532 are coupled to the interior wall surface of the wall 401 by placing the retainer clip 532 at an angle relative to a wall section 402, 404, 406 such that the longitudinal protrusion 424 of the wall section 402, 404, 406 is received in the first recess 585a and the second recess 583b of the retainer clip 532. The retainer clip 532 is then moved to the desired position along the wall section 402, 404, 406 in the direction of arrow 16. Once the retainer clip 532 is in the desired position, the retainer clip 532 is rotated in a direction generally indicated by arrow 18 until the lip 482a and the lip 482b are snap-fittingly received in the slit 584a and the slit 584b respectively, thereby coupling the retainer clip 532 to a wall section 402, 404, 406. Referring to FIG. 42, the retainer clips 532 of each wall section 402, 404, 406 are arranged to form transversely extending retainer clip sets 433.

Use of the storage device 400 will now be discussed. It will be appreciated that use of the storage device 400 is generally identical to that of the storage device 100, except for how fishing rods 10 are received and removed from the retainer clips 532. Accordingly, aspects of use of the storage device 400 that are identical to that of the storage device 100 will not again be described below as these uses have already been described above with respect to the storage device 100.

Referring to FIG. 22, when the wall 401 is in the open configuration, access is provided to the retainer clips 532 thereby allowing fishing rods 10 to be received and removed from the retainer clips 532. A fishing rod 10 is received by the retainer clips 532 of one wall section 402, 404, 406 by moving the first clasp 585a of each retainer clip 532 of the respective wall section 402, 404, 406 to the open position. A further fishing rod 10 may be received by the retainer clips 532 of one wall section 402, 404, 406 by moving the second clasp 585b of each retainer clip 532 of the respective wall section 402, 404, 406 to the open position. In the open position, the first clasp 585a and the second clasp 585b allow passage of a fishing rod 10 into and out of the first retention recess 596a and the second retention recess 596b of the retainer clip 532, respectively. In the closed position, the first clasp 585a and the second clasp 585b inhibit the passage of a fishing rod 10 into and out of the first retention recess 596a and the second retention recess 596b, respectively.

Figures 65, 66, 67:
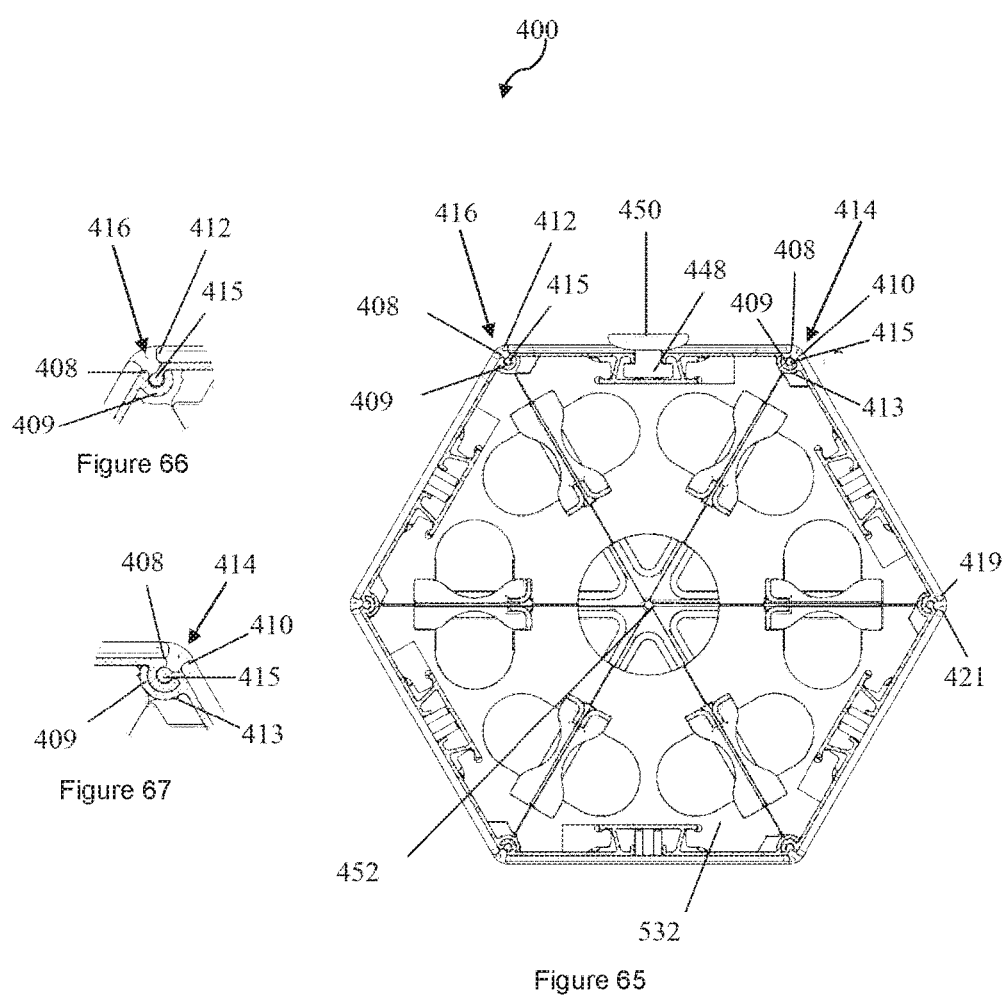
FIGS. 65-67 is an end view of the storage device of FIGS. 40-42 in the closed configuration.

Referring to FIGS. 65-67, when the wall 401 is in the closed configuration, the retainer clips 532 and any fishing rods 10 retained by the retainer clips 532 are located within the cavity 452. In the closed configuration, adjacent retainer clips 532 in each retainer clip set 433 abut to provide support to the storage device 400, respectively.

When the wall 401 is in the closed configuration, each of the cap sections 454 coupled to one of the longitudinal ends of each wall section 402, 404, 406 cooperate to close the longitudinal end of the cavity 452. It will be appreciated that the cap sections 454 prevent any fishing rods 10 held by the retainer clips 532 from slipping out of the storage device 400 in a longitudinal direction when the wall 401 is in either of the open or closed configuration. The cap sections 454 also prevent foreign objects entering the cavity 452 which may damage the fishing rods 10 held by the storage device 400 when the wall 401 is in the closed configuration. The cap sections 454 also prevent damage to the end of the wall sections 402, 404, 406.

It is also envisaged that the storage device 400 may further comprise one or more of the securing means 142 of the storage device 100.

Figure 68:
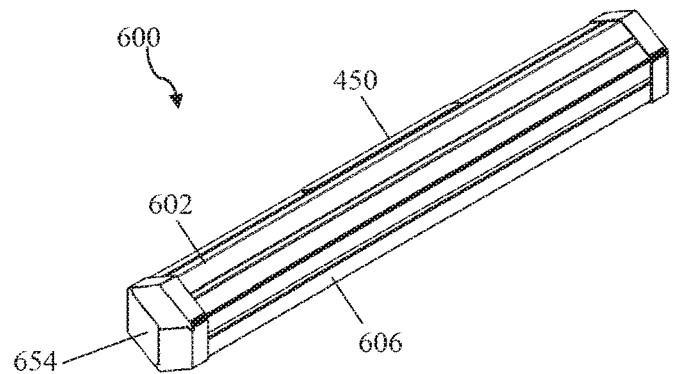
FIGS. 68-70 are views of a third embodiment of a storage device in a closed, partially open and open configuration, respectively.
Figure 69:
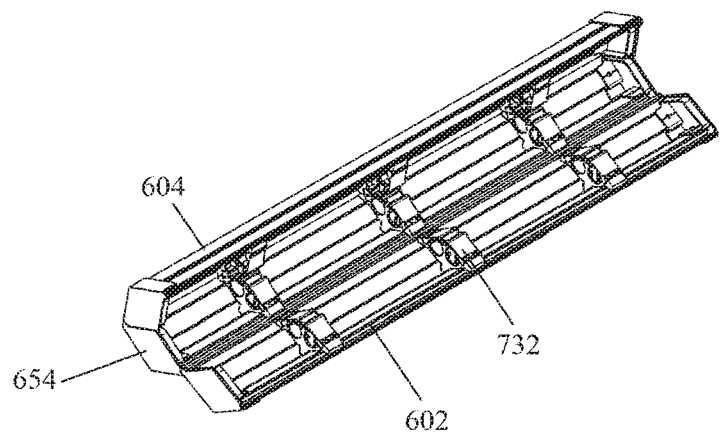
Figure 70:
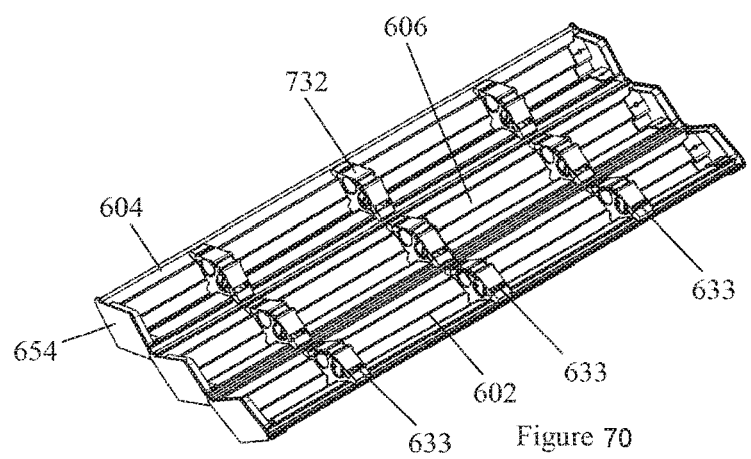
Figure 75:
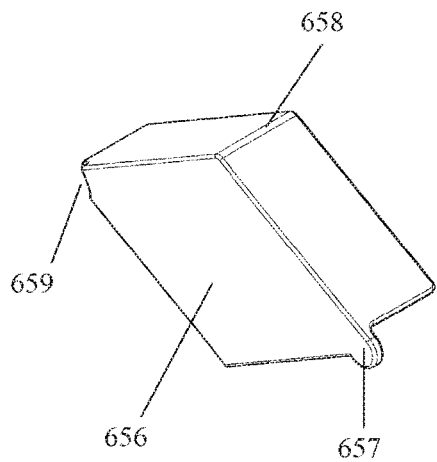
FIGS. 75-78 are various views of a single cap section of the storage device of FIGS. 68-70.
Figure 76:
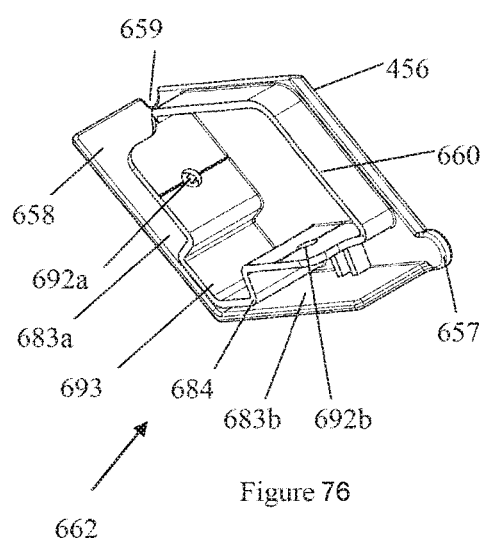
Figure 77:
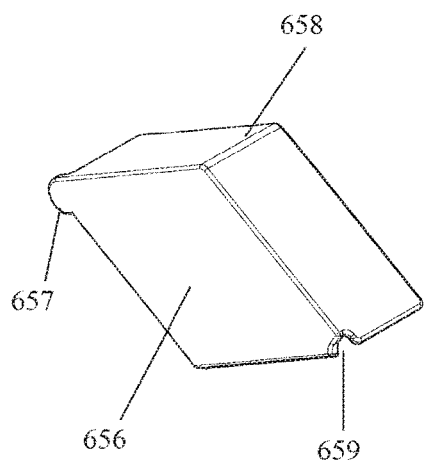
Figure 78:
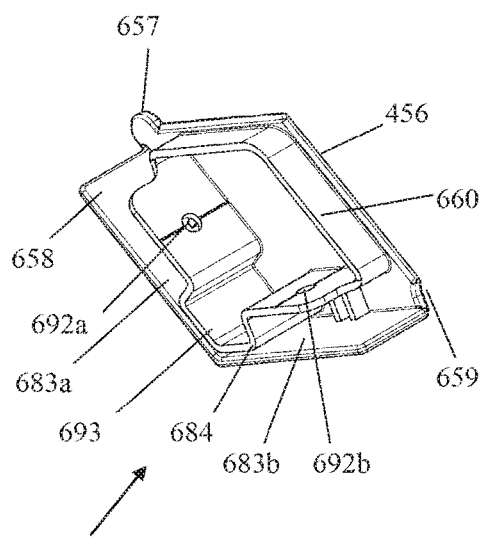

FIGS. 68-70 show a storage device 600 for storing and/or transporting one or more fishing rods 10 according to a third embodiment in a closed configuration, partially open configuration, and an open configuration, respectively. The storage device 600 is similar to the storage device 100. However, the storage device 600 differs from the storage device 100 in that the wall sections 602, 604, 606 that form the wall 601 of the storage device 600 have a different extrusion profile 623. The storage device 600 also has different end caps 654 and retainer clips 732, and does not have the end elements 130 of the storage device 100.

Features of the storage device 600 that are identical or equivalent to those of the storage device 100 are provided with reference numerals that are equivalent to those of the storage device 100 but incremented by 500. For features that are identical between the storage device 100 and the storage device 600, it will be appreciated that the above description of these features in relation to the storage device 100 is also applicable to the corresponding identical/equivalent features found in the storage device 600. Accordingly, the identical features between the storage device 100 and the storage device 600 will not again be described below in relation to the storage device 600 as these features of the storage device 600 have already been described above with respect to the storage device 100.

FIGS. 71-72 show a truncated portion of the wall sections 602/606, and FIGS. 73-74 show a truncated portion of the wall section 604. It can be seen from FIGS. 71-74 that the wall sections 602, 604, 606 are effectively two of the wall sections 402, 404, 406 of the storage device 400 coupled together at an angle. The wall sections 602, 604 and 606 do not include the angled projections 126 of the wall sections of the storage device 100.

The wall sections 602, 604, 606 of the storage device 600 comprise a first longitudinal protrusion 624a and a second longitudinal protrusion 624b. The first longitudinal protrusion 624a and the second longitudinal protrusion 624b define a longitudinal trench 690 therebetween.

The first longitudinal protrusion 624a has a first flange 681a and a second flange 681b extending along a respective longitudinal edge of the first longitudinal protrusion 624a. The first flange 681a has a lip 682a and the second flange 681b has a lip 682b. Each of the lips 682a and 682b extend the length the first flange 681a and the second flange 682b, respectively. Similarly, the second longitudinal protrusion 624b has a first flange 681c and a second flange 681d extending along a respective longitudinal edge of the second longitudinal protrusion 624b. The first flange 681c has a lip 682c and the second flange 681d has a lip 682d. Each of the lips 682c and 682d extend the length the first flange 681c and the second flange 682d, respectively.

FIGS. 75-78 show a cap section 654 for use with the storage device 600. The cap section 654 is similar to the cap section 154 of the storage device 100. The internal surface 660 of the cap section 654 comprises a first space 683a and a second space 683b defined by a portion 684. The portion 684 has a first hole 692a and a second hole 692b, and defines a contour 693.

FIGS. 79-82 show a retainer clip 732 for use with the storage device 600. The retainer clip 732 is similar to the retainer clip 232. However, the retainer clip 732 does not have the channels 240a and 240b of the retainer clip 232, but instead has a first clasp 785a and a second clasp 785b that close a first retention recess 796a and a second retention recess 796b, respectively. Further the engaging end 734 of the retainer clip 732 differs from the engaging end 234 of the retainer clip 232. It is envisaged that the retainer clips 732 may be formed from the same material as the wall sections 602, 604, 606 or any other suitable material. It is also envisaged that the retainer clips 732 may be formed integrally with the wall sections 602, 604, 606, apart from the first clasp 785a and the second clasp 785b that would need to be formed separately.

Features of the retainer clip 732 that are identical or equivalent to those of the retainer clip 232 are provided with reference numerals that are equivalent to those of the retainer clips 232 but incremented by 500. For features that are identical between the retainer clip 232 and the retainer clip 732, it will be appreciated that the above description of these features in relation to the retainer clips 232 is also applicable to the corresponding identical/equivalent features found in the retainer clip 732. Accordingly, the identical features between the retainer clip 232 and the retainer clip 732 will not again be described below in relation to the retainer clip 732 as these features of the retainer clip 732 have already been described above with respect to the retainer clip 232.

The engaging profile 734 of the retainer clip 732 is partially defined by a first extension 788a and a second extension 788b. The first extension 588a has a slit 789a and the second extension 788b has a slit 789b. It can be seen that the slit 789a faces in the opposite direction to that of slit the 789b. The first extension 788a and the second extension 788b have a width substantially equal to the width of the longitudinal trench 690 of the wall sections 602, 604 and 606.

Figure 79:
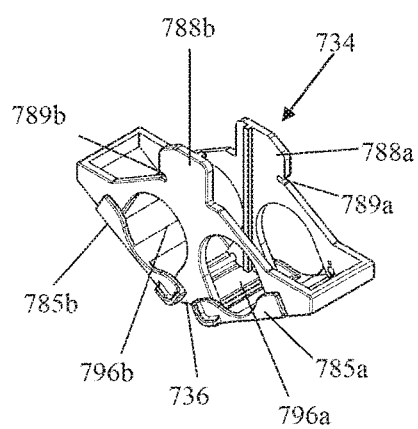
FIGS. 79-82 are views of a fourth embodiment of a retainer clip for use with the storage device of FIGS. 68-70.
Figure 80:
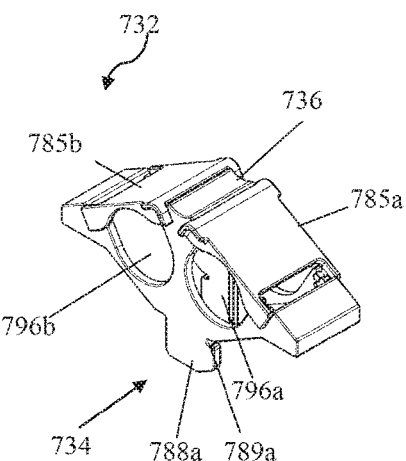
Figure 81:
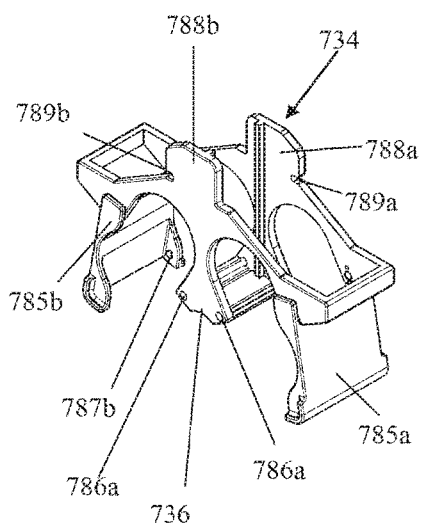
Figure 82:
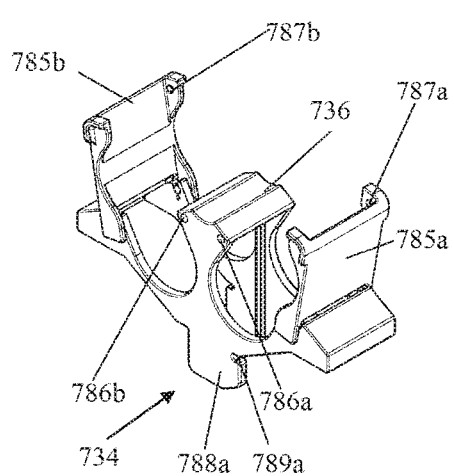

The first clasp 785a and the second clasp 785b are pivotally coupled to the retainer clip 732, and are movable between an open position and a closed position. Referring to FIGS. 79-80, in the closed position, the first clasp 785a and the second clasp 785b close the first retention recess 796a and the second retention recess 796b, respectively. Referring to FIGS. 81-82, in the open position, the first clasp 785a and the second clasp 785b allow access to the first retention recess 796a and the second retention recess 796b, respectively.

The retainer clip 732 has a first pair of depressions 786a and a second pair of depressions 786b. The first clasp 785a has a pair of bumps 787a, and the second clasp 785b has a pair of bumps 787b. In the closed position, the pair of bumps 787a are snap-fittingly received in a respective one of the pair of depressions 786a, thereby securing the first clasp 785a in the closed position. Similarly, the pair of bumps 787b are snap-fittingly received in a respective one of the pair of depressions 786b, thereby securing the second clasp 785b in the closed position.

It will be appreciated that the retainer clips 732 may be used with the storage device 100 by replacing the engaging end 734 of the retainer clip 732 with an engaging end that is generally identical to the engaging end 134 of the retainer clip 132.

Assembly of the storage device 600 will now be discussed. It will be appreciated that assembly of the storage device 600 is substantially similar to that of the storage device 100. Accordingly, aspects of assembly of the storage device 600 that are identical to that of the storage device 100 will not again be described below as they have already been described above with respect to the storage device 100.

Figure 83:
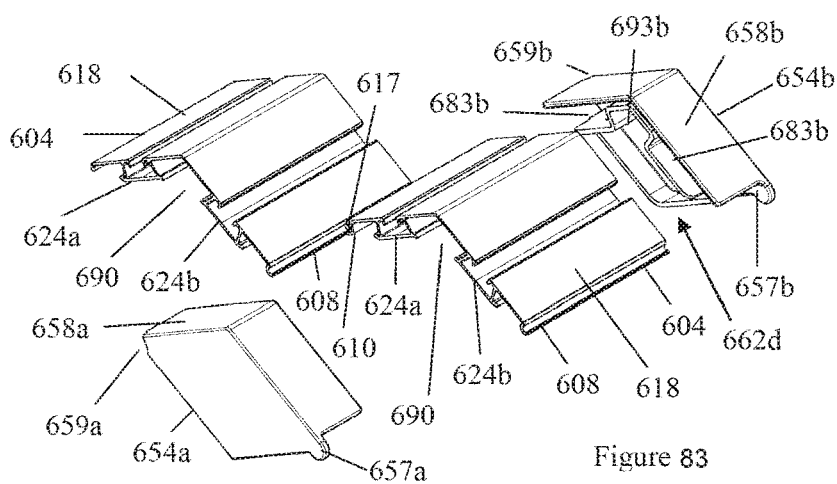
FIGS. 83-86 illustrate the cap sections of FIGS. 75-78 during sequential stages of being coupled to end portions of the storage device of FIGS. 68-70.
Figure 84:
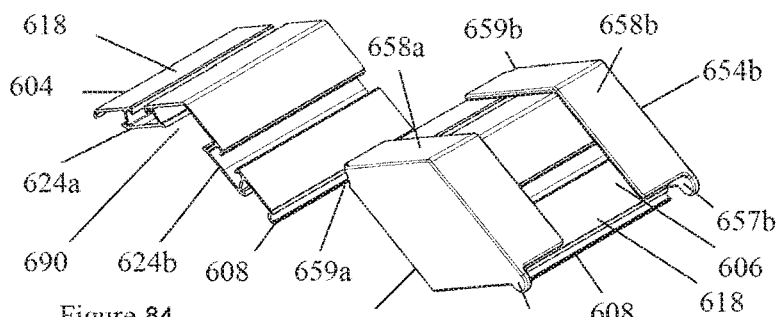

Referring to FIG. 83, cap sections 754a and 754b are coupled to respective ends of the longitudinal wall section 606 by mating the mating profile 662a and 662b of the respective cap sections 654a and 654b to the longitudinal ends of the wall section 606, respectively. Referring to FIG. 84, it can be seen that the external flanges 658a and 658b of the respective caps sections 654a and 654b abut the exterior wall surface 618 of the wall section 606. When the cap sections 654a and 654b are coupled to respective longitudinal ends of the wall section 606, the contours 693a, 693b are received in the longitudinal trench 690 of the wall section 606.

Figure 85:
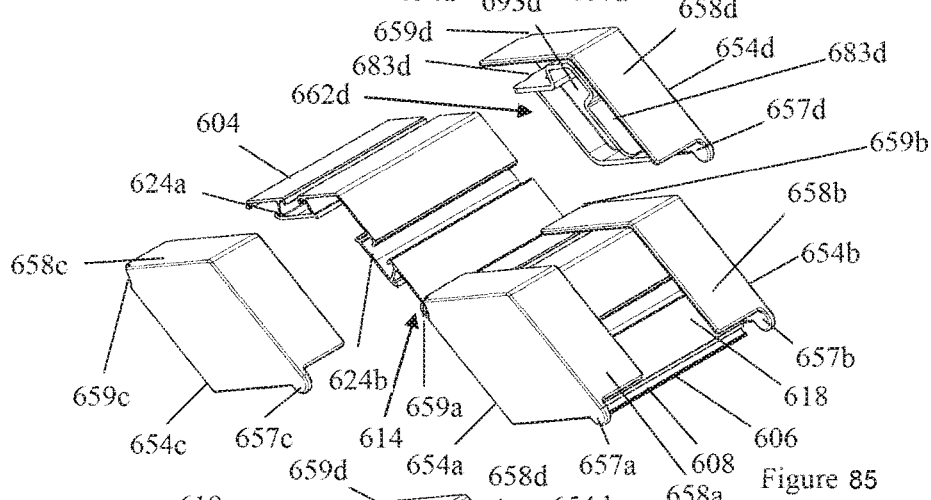
Figure 90:
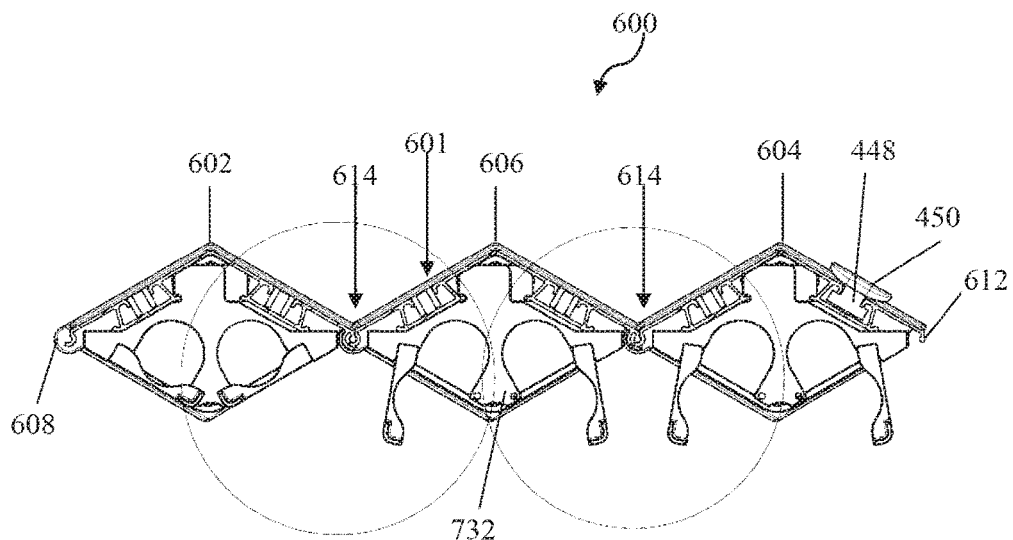
FIGS. 90-92 is an end view of the storage device of FIGS. 68-70 in an open configuration.
Figure 91:
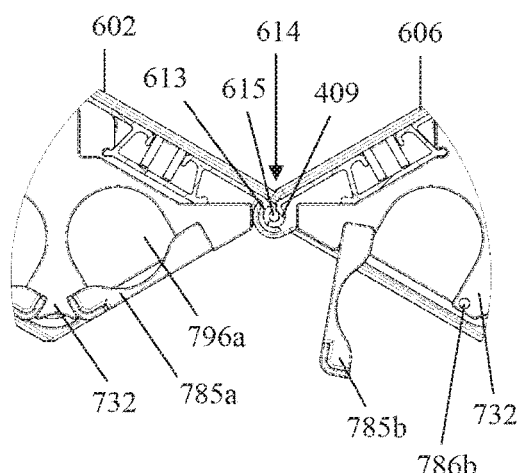
Figure 92:
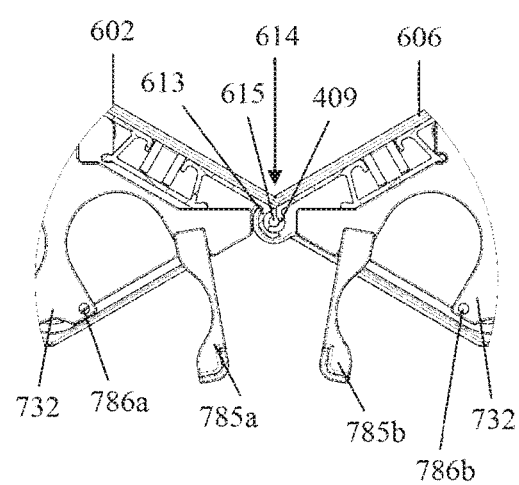

The first coupling profile 608 of the wall section 604 is inserted into the second coupling profile 610 of the wall section 606 at one longitudinal end of the wall section 606. The wall sections 604 and 606 are then moved relative to each other in a longitudinal direction until the longitudinal ends of the wall section 604 are aligned with the longitudinal ends of the wall section 606, thereby forming the pivotal coupling 614 (see FIG. 85). Subsequently, cap sections 654c and 654d are coupled to a respective longitudinal end of the wall section 604 in the same manner that cap sections 654a and 654b were coupled to the wall section 606. It will be appreciated that the remaining wall section 602 is coupled to the wall section 606 in the same manner to that described above so as to form the wall 601, and that the remaining cap sections 654 are coupled to the wall section 602 in the same manner to that described above (see FIGS. 62-64). Referring to FIG. 90-92, it can be seen that a pivotal coupling 614 is formed between each adjacent wall section 602, 604 and 606.

The first longitudinal protrusion 624a and the second longitudinal protrusion 624b of each wall section 602, 604, 606 have a bump (not illustrated) proximate each longitudinal end of the wall section 602, 604, 606. When the cap sections 654 are coupled to respective longitudinal ends of the wall sections 602, 604, 606, each bump is snap-fittingly received within one of the respective holes 692a and 692b of a respective cap section 654, thereby securing the cap sections 654 to a respective longitudinal end of the wall sections 602, 604, 606.

Figure 86:
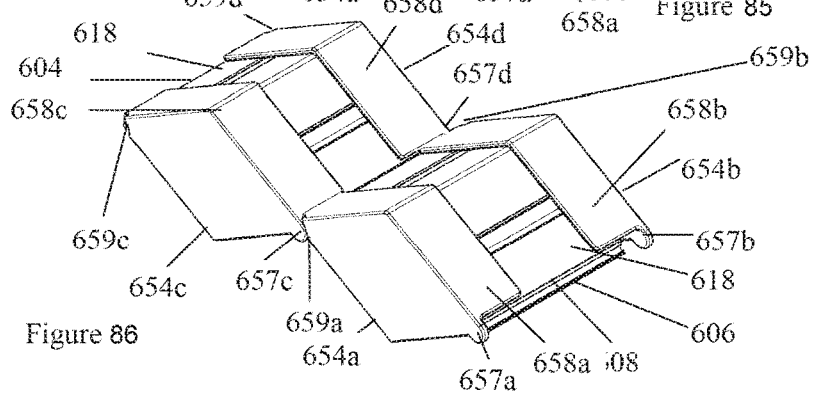

Referring to FIG. 86, when the cap sections 654 have been coupled to respective wall sections 602, 604, 606, the projecting cover portion 657 of a cap section 654 is received in the void 659 of an adjacent cap section 654. The cover portions 657 also cover a respective end of a pivotal coupling 614 formed between adjacent wall sections 602, 604, 606.

Figure 87:
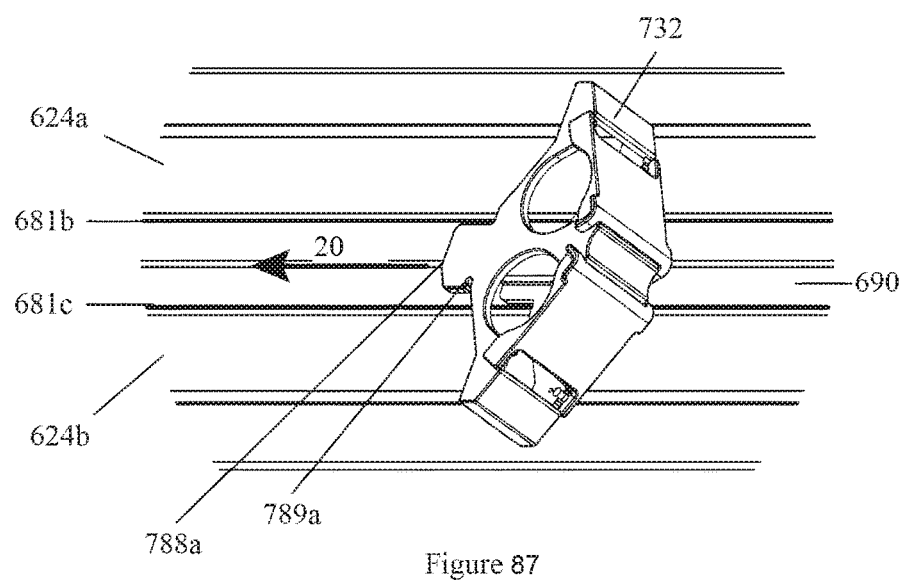
FIGS. 87-89 illustrate the retainers clips of FIGS. 75-78 during sequential stages of being coupled to the inner surface of a wall section of the storage device of FIGS. 68-70.
Figure 88:
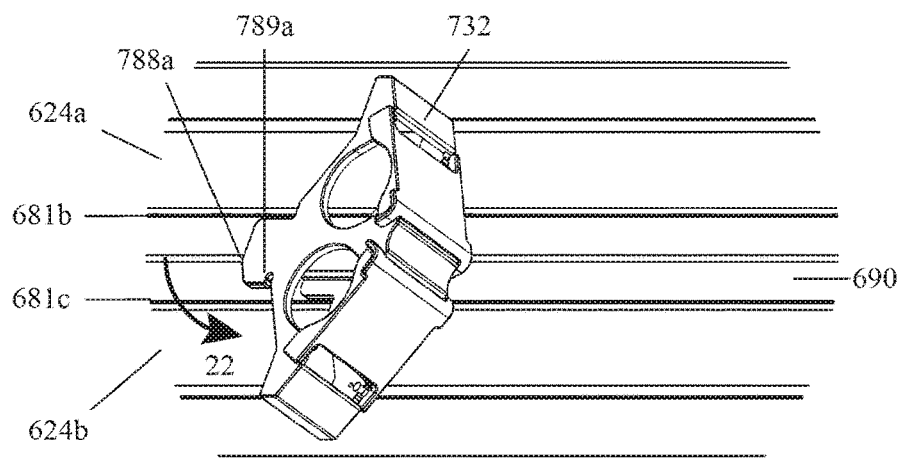
Figure 89:
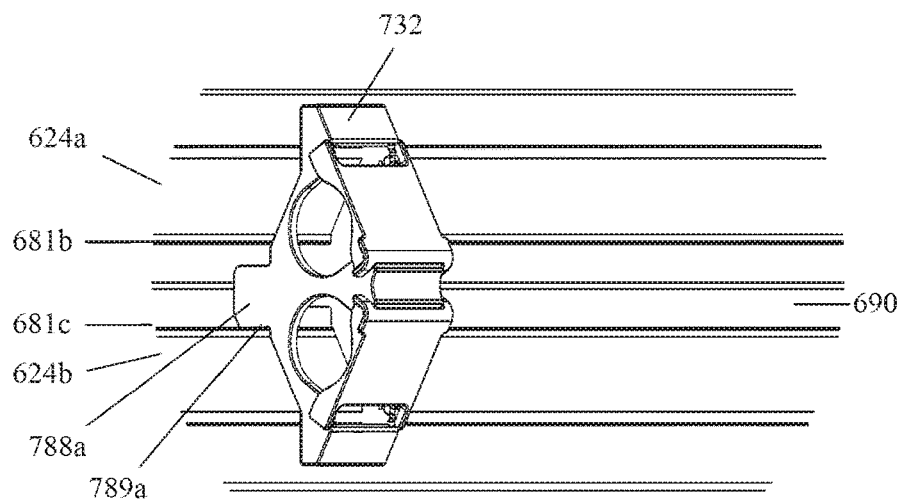

Referring to FIGS. 87-89, the retainer clips 732 are coupled to the interior wall surface of the wall 601 by placing the retainer clip 732 at an angle relative to a wall section 602, 604, 606 such that the first extension 788a and the second extension 788b are received in the longitudinal trench 690 of the wall section 602, 604, 606. The retainer clip 732 is then moved to the desired position along the wall section 602, 604, 606 in the direction of arrow 20. Once the retainer clip 732 is in the desired position, the retainer clip 732 is rotated in a direction generally indicated by arrow 22 until the lip 782b and the lip 782c are snap-fittingly received in the slit 789a and the slit 789b respectively, thereby coupling the retainer clip 732 to a wall section 602, 604, 606. Referring to FIG. 70, the retainer clips 732 of each wall section 602, 604, 606 are arranged to form transversely extending retainer clip sets 633.

Use of the storage device 600 will now be discussed. It will be appreciated that use of the storage device 600 is generally identical to that of the storage device 100, except for how fishing rods 10 are received and removed from the retainer clips 732. Accordingly, aspects of use of the storage device 600 that are identical to that of the storage device 100 will not again be described below as these uses have already been described above with respect to the storage device 100.

Referring to FIG. 90-92, when the wall 601 is in the open configuration, access is provided to the retainer clips 732 thereby allowing fishing rods 10 to be received and removed from the retainer clips 732. A fishing rod 10 is received by the retainer clips 732 of one wall section 602, 604, 606 by moving the first clasp 785a of each retainer clip 732 of the respective wall section 602, 604, 606 to the open position. A further fishing rod 10 may be received by the retainer clips 732 of one wall section 602, 604, 606 by moving the second clasp 785b of each retainer clip 732 of the respective wall section 602, 604, 606 to the open position. In the open position, the first clasp 785a and the second clasp 785b allow passage of a fishing rod 10 into and out of the first retention recess 796a and the second retention recess 796b of the retainer clip 732, respectively. In the closed position, the first clasp 785a and the second clasp 785b inhibit the passage of a fishing rod 10 into and out of the first retention recess 796a and the second retention recess 796b, respectively.

Figure 93:
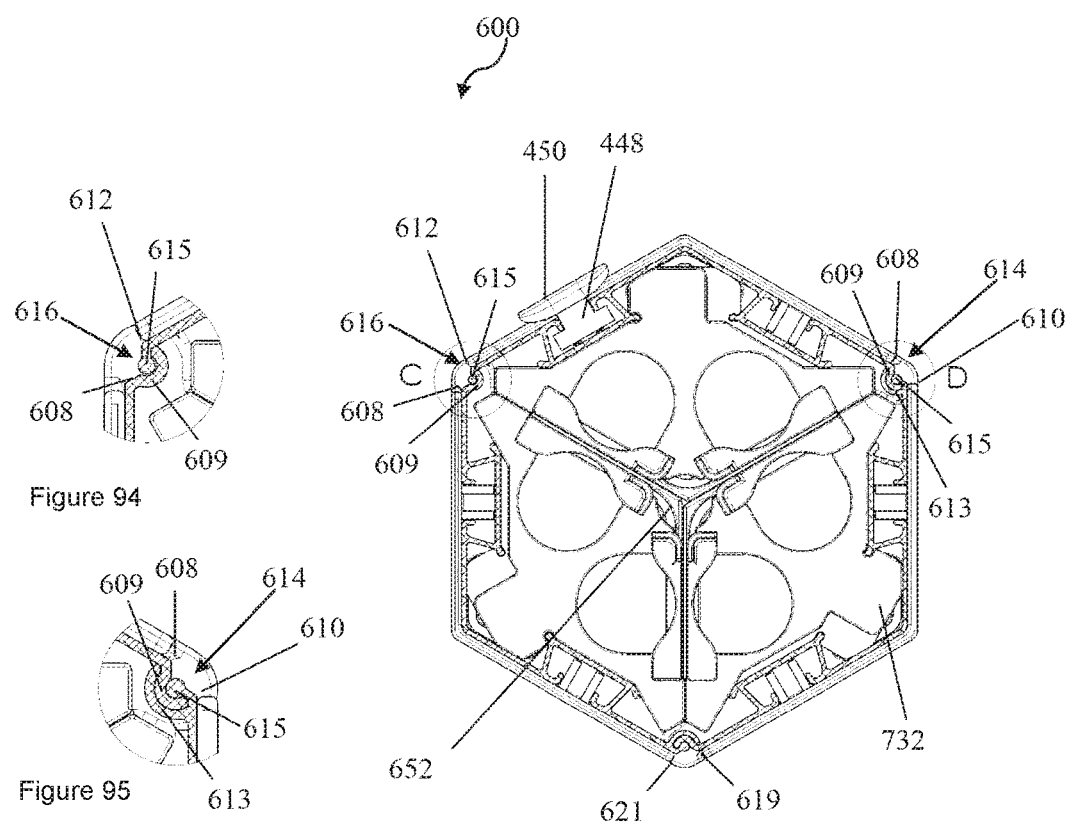

Referring to FIG. 93-95, when the wall 601 is in the closed configuration, the retainer clips 732 and any fishing rods 10 retained by the retainer clips 732 are located within the cavity 652. In the closed configuration, adjacent retainer clips 732 in each retainer clip set 633 abut to provide support to the storage device 600, respectively.

When the wall 601 is in the closed configuration, each of the cap sections 654 coupled to one of the longitudinal ends of each wall section 602, 604, 606 cooperate to close the longitudinal end of the cavity 652. It will be appreciated that the cap sections 654 prevent any fishing rods 10 held by the retainer clips 732 from slipping out of the storage device 600 in a longitudinal direction when the wall 601 is in either of the open or closed configuration. The cap sections 654 also prevent foreign objects entering the cavity 652 which may damage the fishing rods 10 held by the storage device 600 when the wall 601 is in the closed configuration. The cap sections 654 also prevent damage to the end of the wall sections 602, 604, 606.

It is also envisaged that the storage device 600 may further comprise one or more of the securing means 142 of the storage device 100.

Figure 96:
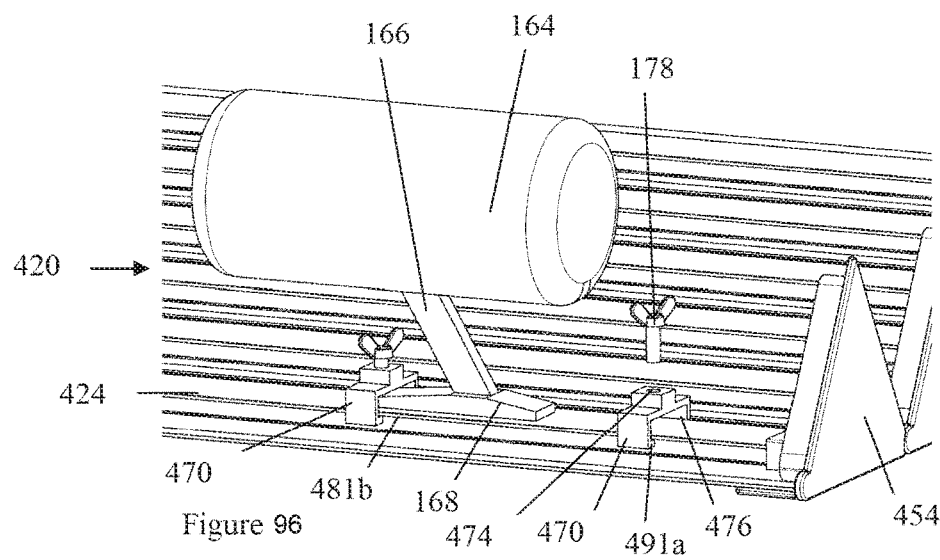
FIGS. 96-98 are views of a fishing reel removably coupled to the storage device of FIGS. 40-42.
Figure 97:
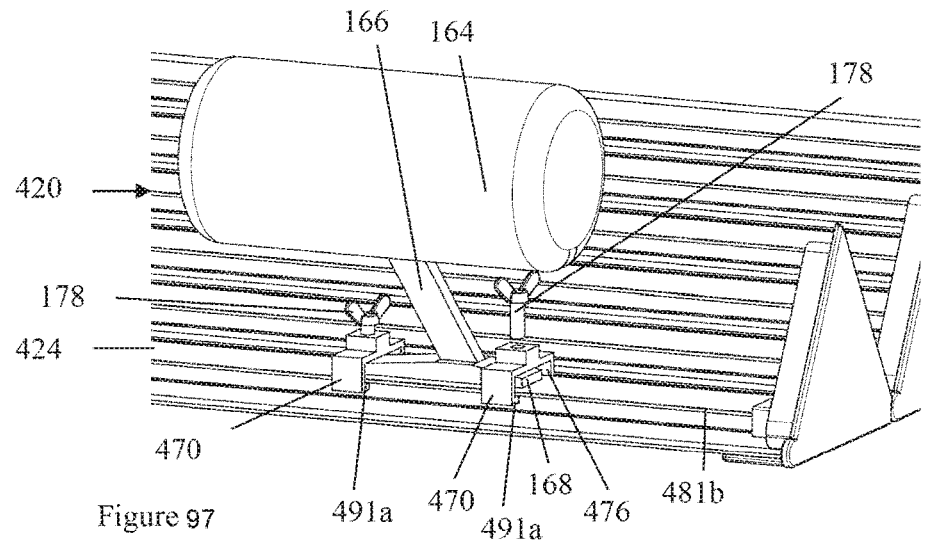
Figure 98:
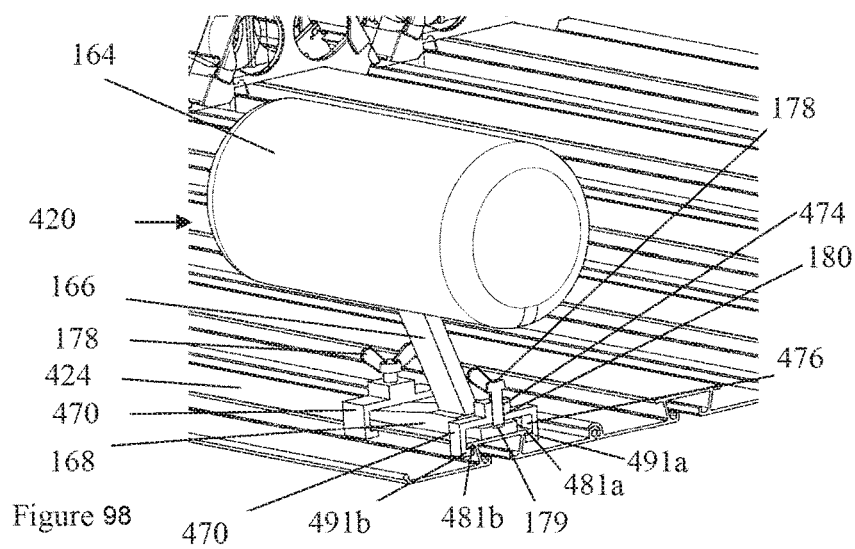

FIGS. 96-98 show the fishing reel 164 removably coupled to one of the wall sections 402, 404, 406. The fishing reel 164 is coupled to the wall section 402, 404, 406 by a pair of securing brackets 470 and the fasteners 178.

Referring to FIG. 98, each securing bracket 470 has a pair of inwardly projecting tabs 491a and 491b, and a threaded aperture 474. It can be seen that each inwardly projecting tab 491a, 491b is configured to engage the side of the first flange 481a and the second flange 481b facing the interior wall surface 420 of the respective wall section 402, 404, 406, respectively. The threaded portion 180 of each fastener 178 is configured to engage with the threaded aperture 474 of one of the securing brackets 470.

Coupling of the fishing reel 164 to a wall section 402, 404, 406 will now be discussed. Each securing bracket 470 is slidably received on the longitudinal protrusion 424 such that the inwardly projecting tabs 491a and 491b are received within the space between the interior wall surface 420 of the wall section 402, 404, 406 and the first flanges 481 and the second flange 481b, respectively. When coupled to the wall section, each securing means 470 defines a passage 476 with the longitudinal protrusion 424 of the wall section 402, 404, 406. The engaging flanges 168 of the fishing reel 164 are positioned between two securing brackets 470 such that the engaging flanges 168 abut the longitudinal protrusion 424 of the wall section 402, 404, 406. Each securing bracket 470 slides along the longitudinal protrusion 424 of the wall section 402, 404, 406 until each engaging flange 168 of the fishing 164 is received in a passage 476 defined by a respective securing bracket 470.

After the securing brackets 470 are in position, each fastener 178 is inserted into a threaded aperture 474 of a respective securing bracket 470 such that the threaded portion 180 of the fastener 178 threadably engages the threaded aperture 474. Each fastener 178 is rotated until the end portion 179 of the fastener 178 passes through the respective securing bracket 470 and abuts one of the engaging flanges 168 of the fishing reel 168. Once the end portion 179 of the fastener 178 abuts one of the engaging flanges 168, tightening the fastener 178 further forces the engaging flanges 168 into the longitudinal protrusion 525 and further forces the securing bracket 470 away from the wall section 402, 404, 406. Consequently, each inwardly projecting tab 491a, 491b of the securing bracket 470 securely engages a respective one of the first flange 481a and the second flange 481b, thereby securing the securing bracket 470 and the fishing reel 164 in place along the wall section 402, 404, 406. It is envisaged that multiple fishing reels 164 can be removably coupled to any of, and anywhere along, the wall sections 402, 404, 406 of the storage device 400.

It is also envisaged that small storage boxes, such as tackle boxes, may also be removably coupled to the wall sections 402, 404, 406 in a similar manner to that of the fishing reels 164 described above. It is further envisaged that a combination of fishing reels 164 and storage boxes may be removably coupled to the wall sections 402, 404, 406 of the storage device 400. When the wall 401 is in the closed configuration, any fishing reels 164 and/or storage boxes removably coupled to the wall sections 402, 404, 406 are located within the cavity 452.

It is also envisaged that fishing reels 164 and/or storage boxes may be removably coupled to the wall sections 602, 604, 606 of the storage device 600 in a similar manner to that described above with respect to the storage device 400. It will be appreciated that the fishing reels 164 and/or storage boxes may be removably coupled to the first longitudinal protrusion 624a and/or the second longitudinal protrusion 624b of each of the wall sections 602, 604, 604 of the storage device 600.

FIGS. 99-100 show an alternative handle 850 that may be used with any of the storage devices 100, 400 and 600. The handle 850 comprises a strap 894 that is made of a flexible material and two attachments keys 848. The attachment keys 848 are configured to be slidingly received, and removably retained, within the longitudinal recesses of the wall sections of the storage devices 100, 400 and 600, thereby coupling the handle 850 to the wall of the storage devices 100, 400, 600. It will be appreciated that the attachment keys 848 are able to slide toward and away from each other within the longitudinal recesses of the wall sections of the storage devices 100, 400, 600, thereby allowing the handle 850 to move between a stowed position and an in use position.

FIGS. 101-102 show the handle 850 coupled to the storage device 400, and FIGS. 103-104 show the handle coupled to the storage device 600. Referring to FIGS. 101-103, in the stowed position, the strap 894 lies substantially flat against the exterior wall surface 418 and 618 of the storage devices 400 and 600, respectively. Referring to FIGS. 102-104, in the in use position, the attachment keys 848 have been moved towards each other thereby forcing the strap 894 upwards, thereby forming a gap 895 between the strap 894 and the exterior wall surface 418, 618 of the storage devices 400, 600, respectively. The gap 895 allows a user to grasp the strap 894 and carry the storage device 400, 600. Although, the handle 850 has only been illustrated with respect to the storage devices 400 and 600, it will be appreciated that it can be used with the storage device 100 in the same manner to that described above with respect to the storage devices 400 and 600.

Although the above storage devices have been described having wall sections that are a single piece, it is also envisaged that each wall section may be made from multiple wall sections coupled to each other end-to-end to create wall sections having a desired length.

Accordingly, the storage devices described may securely hold multiple fishing rods such that the fishing rods are protected from sudden damaging forces during transport. The storage devices hold each fishing rod being held therein separately thereby preventing the fishing rods contacting and damaging each other. Further, removal and insertion of a single fishing rod from the storage device is simplified.

Although the preferred embodiments have been described in relation to use with fishing rods, it will be appreciated that the storage device is not limited to this use. The storage devices can also be used to hold other sporting and commercial equipment such as, for example, camera tripod equipment, knives, rifles, arrows for archery, etc.

Although the storage devices have been described with reference to preferred embodiments, it will be appreciated by persons skilled in the art that the invention may be embodied in many other forms.

The invention claimed is:

1. A storage device for holding at least one elongate article, the storage device comprising:
   a case having a plurality of walls, each one comprising an interior wall surface and an exterior wall surface, at least one of the plurality of walls being movable about a longitudinally-extending hinge between an open configuration and a closed configuration, the closed configuration providing a longitudinally-extending cavity; and
   at least one retainer coupled to the interior wall surface, the at least one retainer being configured to receive and retain the at least one elongate article in a generally longitudinally extending orientation;
   wherein the plurality of walls being wall sections of substantially uniform cross profile along their length, and the interior wall surface including formations configured to cooperate with a base portion of the at least one retainer for sliding retention thereon, and
   the exterior wall surface including a corresponding formation, inverse to the formation on the interior wall surface, for receiving a securing means to secure the case to a structure.

2. The storage device of claim 1, further comprising a releasable coupling configured to releasably retain the plurality of walls in the closed configuration.

3. The storage device of claim 1, the plurality of wall sections comprising: a first end wall section; a second end wall section; and one or more intermediate wall sections disposed between the first and second end wall sections, further wherein each wall section has a longitudinally extending first edge and a longitudinally extending second edge.

4. The storage device of claim 1, wherein a plurality of the retainers are coupled to the interior wall surface and the plurality of retainers are arranged in transversely extending sets, each set being longitudinally spaced from adjacent sets.

5. The storage device of claim 4, wherein adjacent retainers in each set abut each other to provide support to the plurality of walls when the plurality of walls is in the closed configuration.

6. The storage device of claim 1 wherein the formations of the interior wall surface include a channel or securing means in which the at least one retainer is configured to slide.

7. The storage device of claim 6 wherein at least one surface of the channel includes teeth or ribs for inhibiting release of the at least one retainer from the channel.

8. The storage device of claim 3, wherein a pivotal coupling pivotally couples adjacent wall sections.

9. The storage device of claim 8, wherein the first edge of each intermediate wall section and the first edge of the second end wall section each comprise a first coupling profile; and the second edge of each intermediate wall section and the second edge of the first end wall section each comprise a second coupling profile, further wherein each pivotal coupling is formed by one of the first coupling profiles engaging an adjacent second coupling profile.

10. The storage device of claim 9, wherein the first edge of the first end wall section comprises the first coupling profile; and the second edge of the second end wall section comprises a third coupling profile, further wherein the first coupling profile of the first end wall section and the third coupling profile of the second end wall section form the releasable coupling.

11. The storage device of claim 1, wherein each wall section is in the form of an extrusion or molding.

12. The storage device of claim 1 wherein each retainer comprises:
    an end couplable to the interior wall surface;
    an exterior retainer surface;
    a first aperture for receipt of the elongate article, the first aperture extending in the longitudinal direction of the storage device; and
    a first channel extending from the exterior retainer surface to the first aperture, the retainer being deformable such that the first channel is configurable between an open position and a closed position;
    wherein in the open position, the first channel allows for the passage of the elongate article into and out of the first aperture, and, in the closed position, the first channel inhibits passage of any elongate article into and out of the first aperture.

13. The storage device of claim 12, wherein each retainer further comprises:
    a second aperture for receipt of another elongate article, the second aperture extending in the longitudinal direction of the storage device; and
    a second channel extending from the exterior retainer surface to the second aperture, the retainer being deformable such that the second channel is configurable between an open position and a closed position;
    wherein in the open position, the second channel allows for the passage of the other elongate article into and out of the second aperture, and, in the closed position, the second channel inhibits passage of any elongate article into and out of the second aperture.

14. The storage device of claim 1, wherein each retainer comprises:
    an end couplable to the interior wall surface;
    an exterior clip surface;
    a first retention recess for receipt of the at least one elongate article, the first retention recess extending in the longitudinal direction of the storage device; and
    a first clasp pivotally coupled to the retainer, the first clasp moveable between an open position and a closed position;
    wherein in the open position, the first clasp allows for the passage of the elongate article into and out of the first retention recess, and, in the closed position, the first clasp closes the first retention recess thereby inhibiting passage of any elongate article into and out of the first retention recess.

15. The storage device of claim 14, wherein each retainer further comprises:
    a second retention recess for receipt of another elongate article, the second retention recess extending in the longitudinal direction of the storage device; and
    a second clasp pivotally coupled to the retainer, the second clasp moveable between an open position and a closed position;

wherein in the open position, the second clasp allows for the passage of the elongate article into and out of the second retention recess, and, in the closed position, the second clasp closes the second retention recess thereby inhibiting passage of any elongate article into and out of the second retention recess.

16. The storage device of claim 1, wherein the at least one retainer is detachably coupled to the interior wall surface.

17. The storage device of claim 1, wherein the at least one retainer is formed of a first material and the plurality of walls is formed of a second material, the first material being softer than the second material.

18. The storage device of claim 1, wherein a mounting fitting is coupled to the exterior wall surface and a mounting element for the mounting fitting cooperates with the corresponding formation disposed on the exterior wall surface.

19. The storage device of claim 18 wherein the corresponding formation of the exterior wall surface is a channel recessed into the exterior wall surface.

20. The storage device of claim 2 wherein the releasable coupling fastens to the securing means mounted in the corresponding formation on the exterior wall surface.

* * * * *